(12) United States Patent
Rouby et al.

(10) Patent No.: US 12,661,859 B2
(45) Date of Patent: Jun. 23, 2026

---

(54) GROOVED-CORE TOOLING FOR MANUFACTURING PNEUMATIC TIRES REINFORCED BY STAYS PASSING THROUGH THE INFLATION CAVITY

(71) Applicant: Compagnie Generale Des Etablissements Michelin, Clermont-Ferrand (FR)

(72) Inventors: Mickael Rouby, Clermont-Ferrand (FR); Clément Nagode, Clermont-Ferrand (FR); Thomas Simonelli, Clermont-Ferrand (FR); François Rouyet, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 187 days.

(21) Appl. No.: 18/283,123

(22) PCT Filed: Mar. 17, 2022

(86) PCT No.: PCT/FR2022/050489
§ 371 (c)(1),
(2) Date: Sep. 20, 2023

(87) PCT Pub. No.: WO2022/200718
PCT Pub. Date: Sep. 29, 2022

(65) Prior Publication Data
US 2024/0165901 A1 May 23, 2024

(30) Foreign Application Priority Data
Mar. 17, 2022 (FR) ..................................... 2102830

(51) Int. Cl.
*B29D 30/12* (2006.01)
*B29D 30/72* (2006.01)

(52) U.S. Cl.
CPC ............. *B29D 30/12* (2013.01); *B29D 30/72* (2013.01)

(58) Field of Classification Search
CPC ........ B29D 30/12; B29D 30/24; B29D 30/72; B29D 2030/0612; B29D 2030/1664;
(Continued)

(56) References Cited

U.S. PATENT DOCUMENTS 4,936,365 A * 6/1990 Chrobak ............... B60C 13/004
152/452

FOREIGN PATENT DOCUMENTS

| | | |
|---|---|---|
| EP | 2221159 A1 | 8/2010 |
| FR | 2583399 A1 | 12/1986 |

(Continued)

OTHER PUBLICATIONS

Higuchi Tei, JP-2000317940-A, machine translation. (Year: 2000).*
Tomoharu Torii, JP-5113861-B2, machine translation. (Year: 2013).*

*Primary Examiner* — Sedef E Paquette
(74) *Attorney, Agent, or Firm* — Dickinson Wright PLLC

(57) ABSTRACT

The tooling is suitable for manufacturing a toroidal tire that has a crown, a first annular bead and a second annular bead, together with a first sidewall and a second sidewall. The, tool has a core which is provided with groove-type passages that are suitable for receiving reinforcing elements, referred to as "stays." The stays are designed to be permanently incorporated into the structure of the tire and to each extend in the cavity of the tire, thereby connecting a crown anchor point situated in the crown of the tire to a lateral anchor point situated in one of the sidewalls or beads of the tire.

24 Claims, 16 Drawing Sheets

(58) Field of Classification Search
      CPC .... B29D 2030/1671; B29D 2030/2628; B29D
                              2030/265; B29D 2030/2657
      USPC ............... 156/117; 152/516; 425/49, 54, 55
      See application file for complete search history.

(56)                    References Cited

FOREIGN PATENT DOCUMENTS

| JP | 2000317940 A | * | 11/2000 |
| JP | 2003311741 A | | 11/2003 |
| JP | 5113861 B2 | * | 1/2013 |
| WO | 0250410 A1 | | 6/2002 |
| WO | 03055667 A1 | | 7/2003 |
| WO | 2016157001 A1 | | 10/2016 |

* cited by examiner

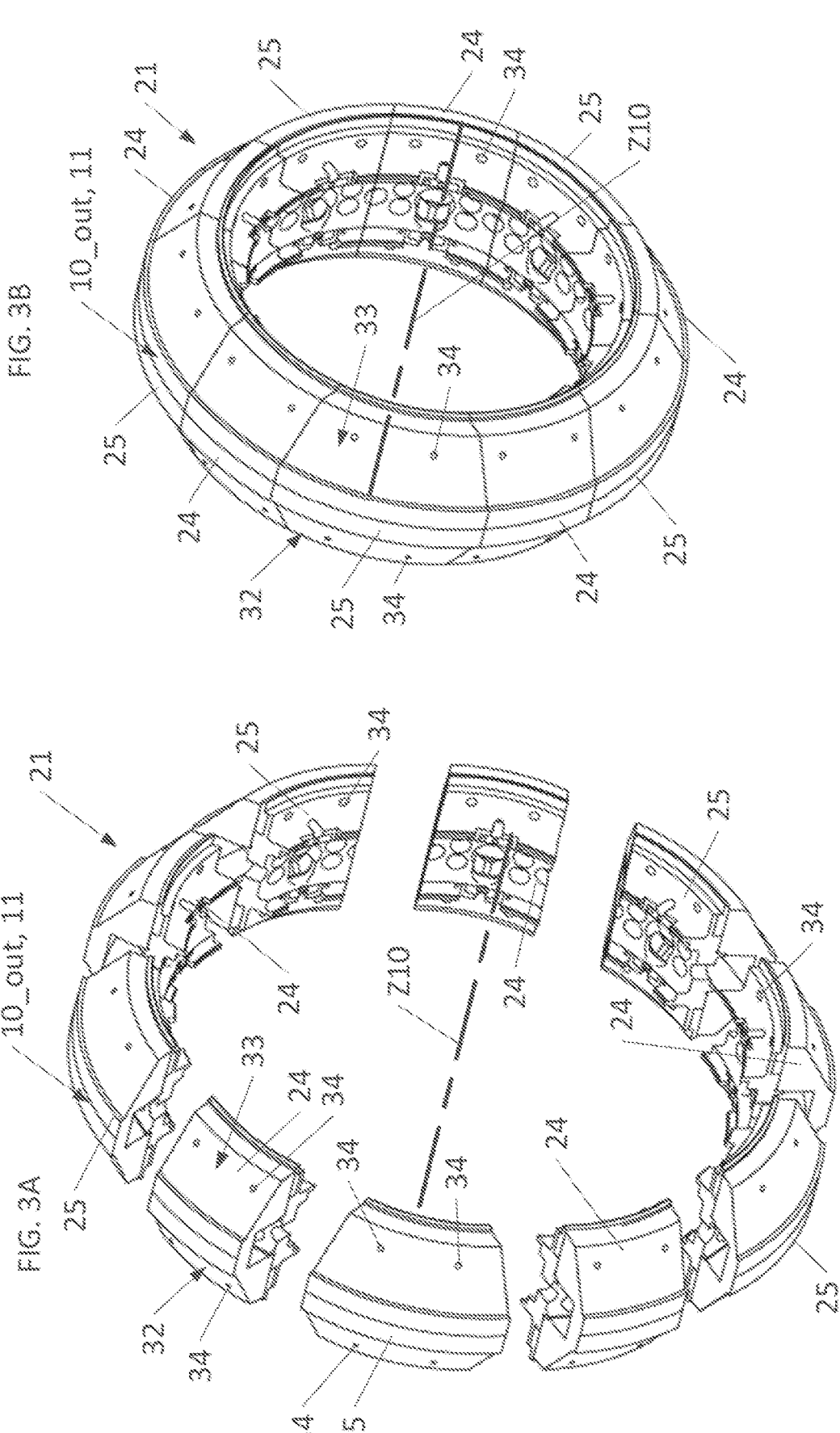

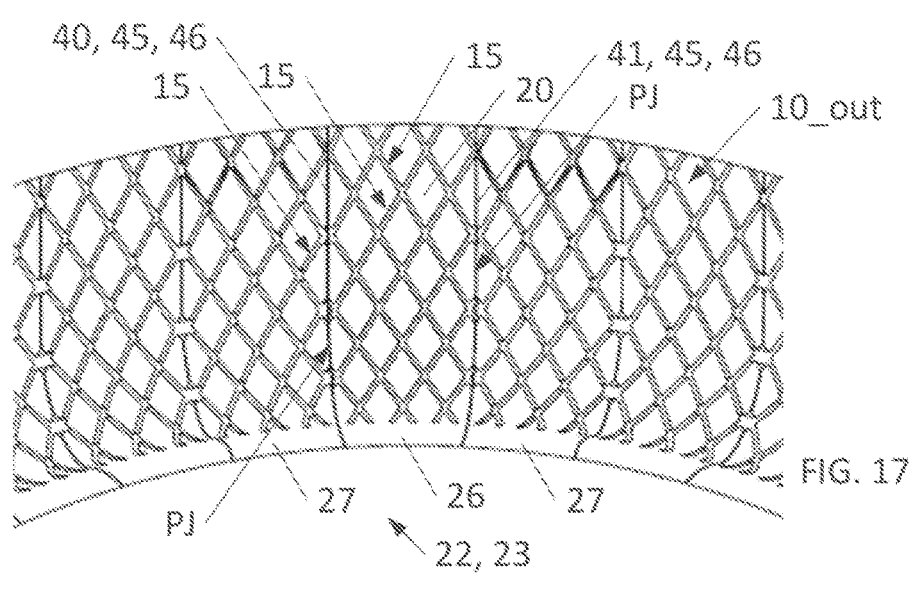
FIG. 17
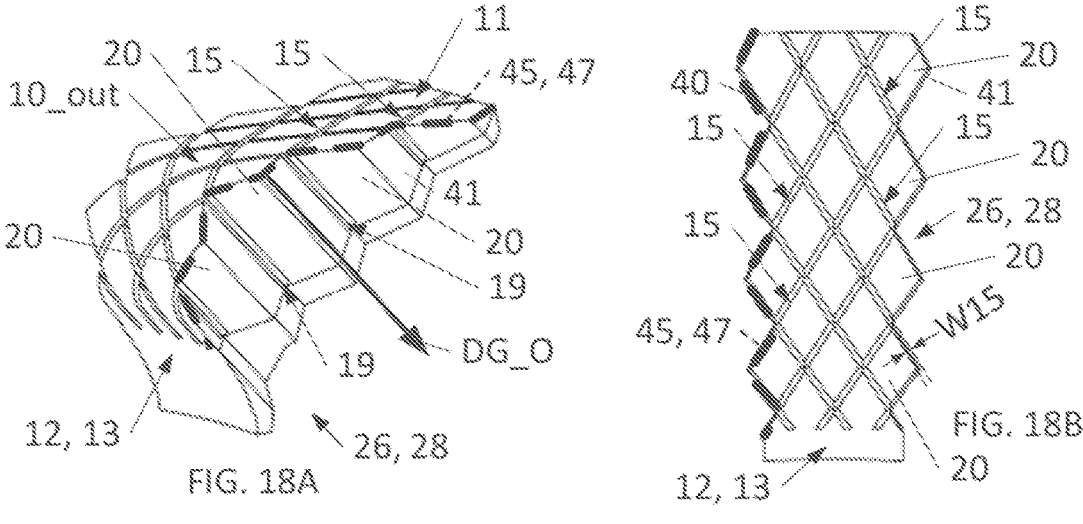
FIG. 18A
FIG. 18B
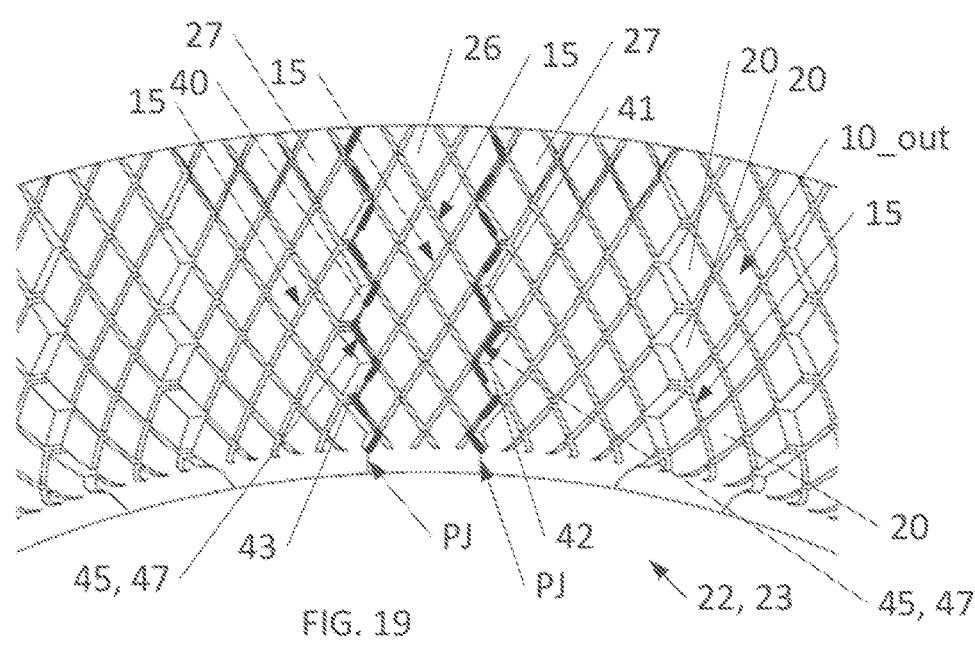
FIG. 19

GROOVED-CORE TOOLING FOR MANUFACTURING PNEUMATIC TIRES REINFORCED BY STAYS PASSING THROUGH THE INFLATION CAVITY

CROSS-REFERENCE TO RELATED APPLICATION

This application claims priority to and the benefit of PCT Patent Application No. PCT/FR2022/050489 filed on 17 Mar. 2022, entitled "GROOVED-CORE TOOLING FOR MANUFACTURING PNEUMATIC TYRES REINFORCED BY STAYS PASSING THROUGH THE INFLATION CAVITY," and French Patent Application No. FR2102830, filed on 22 Mar. 2021, entitled "GROOVED-CORE TOOLING FOR MANUFACTURING PNEUMATIC TYRES REINFORCED BY STAYS PASSING THROUGH THE INFLATION CAVITY".

BACKGROUND

1. Field

The present disclosure relates to the general field of manufacturing toroidal tires, and more particularly pneumatic tires intended to be fitted to vehicle wheels.

2. Related Art

In order to improve the performance, in particular the cornering, of pneumatic tires, the applicant had the idea of implementing stay reinforcements that extend inside the toric inflation cavity that defines the tire, and that each connect an anchor point situated in the sidewall or the bead of the tire to an anchor point situated on the crown of the tire.

Of course, the manufacturing tools in industrial use are unsuitable for producing such stayed tires, due to the very specific shape thereof.

SUMMARY

The objects assigned to the disclosure therefore aim to overcome the aforementioned drawbacks and propose a tool, and a manufacturing method, that make it possible to obtain a high-quality stayed tire in a relatively simple and reproducible manner.

The objects assigned to the disclosure are achieved by means of a tool suitable for manufacturing a toroidal tire comprising a crown suitable for forming a tread, a first annular bead and a second annular bead designed to make it possible to attach the tire to a mounting support such as a rim, together with a first sidewall and a second sidewall that connect the crown to the first bead and to the second bead respectively. The crown, the first and second sidewalls and the first and second beads as a whole form a wall that has a concave inner surface that defines a cavity of the tire. The tool has a toroidal core with, about its central axis, a convex outer surface, referred to as the "receiving surface", which has a shape conjugate to the inner surface of the wall of the tire and which comprises to this end a radially outer crown zone suitable for receiving components forming the crown of the tire. The tool also has, axially on either side of the crown zone, a first lateral zone turned in towards the central axis and suitable for receiving components forming the first sidewall and the first bead, together with a second lateral zone turned in towards the central axis and suitable for receiving components forming the second sidewall and the second bead, so that the core embodies a volume, referred to as the "reserved volume", which is externally delimited by the receiving surface and corresponds to the cavity of the tire. The core has a plurality of passages that extend inside the reserved volume, below the receiving surface, and which open onto the receiving surface so that each of the passages connects the crown zone of the receiving surface to one of the first and second lateral zones so that the core can receive, inside the passages, reinforcing elements, referred to as "stays." The stays are designed to be permanently incorporated into the structure of the tire, and each stay extends in the cavity of the tire, connecting a crown anchor point situated in the crown of the tire to a lateral anchor point situated in one of the sidewalls or beads of the tire.

Advantageously, the use of a core according to the disclosure makes it possible to position the stays in the desired locations within the volume reserved by the core, and consequently in the region of space that will subsequently become the cavity of the tire after the tire has been formed and the core has been removed.

Advantageously, during the placing of the stays within the core, a portion of each stay is located inside the corresponding passage, and therefore in the region of space that corresponds to the future cavity of the tire, while the ends of the stay protrude outside the passage, on the receiving surface.

When the various rubber-based components that form the wall of the tire are then laid on the receiving surface of the core, for example by spiral winding of continuous strips, the ends of each stay are thus incorporated immediately and permanently into the structure of the wall of the tire, while the intermediate portion of the stay in question, situated in the passage, is set back from the receiving surface and therefore remains detached and distant from the wall of the tire during and after the laying of the components forming the wall of the tire, and is thus preferably from the outset in the position that the intermediate portion of the stay will permanently occupy within the cavity of the tire.

In addition, as the core has a toric shape that corresponds to the final shape of the desired tyre, the wall of the tire is advantageously, in a manner known per se, directly shaped as desired, simply by laying the components forming the wall of the tire on the core.

The core bearing the tire is then placed in a mold in order to cure the tire, which makes it possible to vulcanize the components of the wall of the tire, which are rubber-based. After this curing operation, the core is separated from the tire, thus releasing the cavity of the tire and permanently leaving the stays in place in the cavity.

Advantageously, the tool according to the disclosure therefore makes it possible to obtain from the outset, and reproducibly, an appropriately shaped stayed tire, without any risk of incorrectly positioning or damaging the stays during the manufacturing of the tire.

BRIEF DESCRIPTION OF THE DRAWINGS

Further objects, features and advantages of the disclosure will become apparent in more detail on reading the following description and with the aid of the appended drawings, which are provided purely by way of non-limiting illustration, in which:

FIGS. 3A and 3B illustrated, in exploded and assembled perspective views respectively, an annular sub-assembly forming a central ring of a core according to the disclosure, the central ring forming a central portion of the crown zone suitable for receiving the components forming the crown of the tire, and the central ring being angularly sub-divided into sectors, which form alternating sectors referred to as arch segments and sectors referred to as keys designed to lock the arch segments in position.

FIG. 17 illustrates, in a partial perspective view at a viewing angle corresponding to the oblique generative direction, a lug resulting from the assembly of lug keys and lug arch segments the grooves and parting lines of which are obtained in the oblique generative direction, as is the case for the lug sectors in FIGS. 13A to 13D and 14A to 14D, or 15A to 15C.

FIGS. 18A and 18B illustrate, in a perspective view and a view projected in the generative direction of the lateral walls of the criss-crossed grooves respectively, a variant embodiment of a lug key with criss-crossed grooves within which the parting lines are generated in the oblique generative direction along a zigzag cutting line starting from a base profile that corresponds to a broken line formed, on the receiving surface, by the alternating sides of the quadrilaterals that define the criss-crossed grooves on the receiving surface, and which follow on from each other from the crown zone to the lateral zone.

FIG. 19 illustrates, in a partial perspective view at a viewing angle corresponding to the oblique generative direction, a lug resulting from the assembly of lug keys and lug arch segments the parting lines of which follow a zigzag cutting line like the lug key in FIGS. 18A and 18B.

DESCRIPTION OF EMBODIMENTS

Figure 1B:
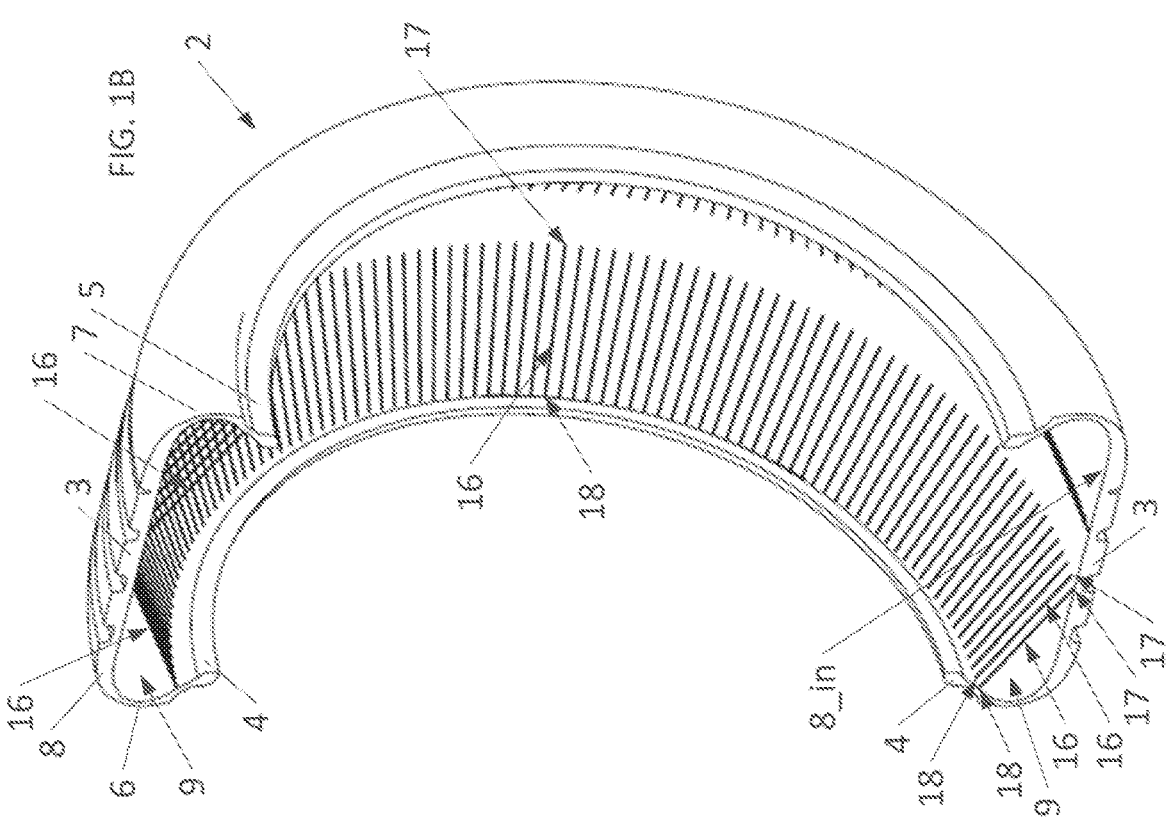
FIGS. 1A and 1B illustrate, in a cross-sectional view in a radial plane and a perspective view with cutaway along a radial plane respectively, an example of a stayed tire produced according to the disclosure, within which the crown and lateral anchor points of each stay are situated at the same azimuth about the central axis of the tire, so that the stays extend along radial planes containing the central axis of the tire.

The present disclosure relates to a tool 1, as illustrated in particular in FIGS. 4A, 4B, 4C, 5A, 5B, 5C and 6A, 6B and 6C, which tool 1 is suitable for manufacturing a toroidal tire 2, as illustrated in FIGS. 1A, 1B, 2A and 2B.

Such a tire 2 preferably forms a pneumatic tire suitable for being fitted to a wheel of a vehicle, in order to provide contact between the vehicle and the ground.

The tire 2 has a shape exhibiting symmetry of revolution about an axis referred to as the "central axis" Z2 that in practice corresponds substantially to the axis of rotation of the wheel. This central axis Z2 defines three directions conventionally used by those skilled in the art: an axial direction, a radial direction and a circumferential direction.

"Axial direction" is given to mean a direction vectorially collinear with, that is parallel to, the central axis Z2 of the tire, that is, parallel to the axis of rotation of the tire.

"Radial direction" is given to mean a direction that extends along a radius of the tyre, that is, any direction that is secant and perpendicular to the central axis Z2.

"Circumferential direction" is given to mean a direction that is perpendicular both to the axial direction and to a radius of the tire, and which therefore corresponds, in a plane normal to the central axis Z2, to the tangent to a circle centered on the axis of rotation of the tire.

"Meridian plane" P_MER, or "radial plane" is given to mean a plane parallel to, and containing, the central axis Z2. Such a meridian plane is therefore normal to the circumferential direction.

"Equatorial plane" P_EQ denotes the plane normal to the central axis Z2 and passing through the radially outermost point of the tire, which is preferably situated axially halfway between the axially outermost points of the tire. The equatorial plane therefore divides the tire 2 axially into two toroidal halves, preferably substantially equal, referred to as "hemispheres" by analogy with the globe.

The tire 2 comprises, in a manner known per se, a crown 3 suitable for forming a tread, a first annular bead 4 and a second annular bead 5 designed to make it possible to attach the tire 2 to a mounting support such as a rim, together with a first sidewall 6 and a second sidewall 7 that connect the crown 3 to the first bead 4 and the second bead 5 respectively.

By convention, in a meridian plane P_MER, the boundary between the crown 3 and the sidewall 6, 7 in question can be considered to correspond to the axially outermost point of the outer surface of the tire 2 for which the angle between the tangent to the outer surface of the tire 2 and a straight line parallel to the central axis Z2 is equal to 30 degrees.

The crown 3, the first and second sidewalls 6, 7 and the first and second beads 4, 5 as a whole form a wall 8 having a concave inner surface 8_in that defines a cavity 9 of the tire 2.

In practice, the cavity 9 of the tire is toric, and advantageously forms the inflation cavity of the tire 2, which is suitable for receiving a pressurized fluid, such as air, in order to support the crown 3 of the pneumatic tire 2 relative to the rim.

Figure 1A:
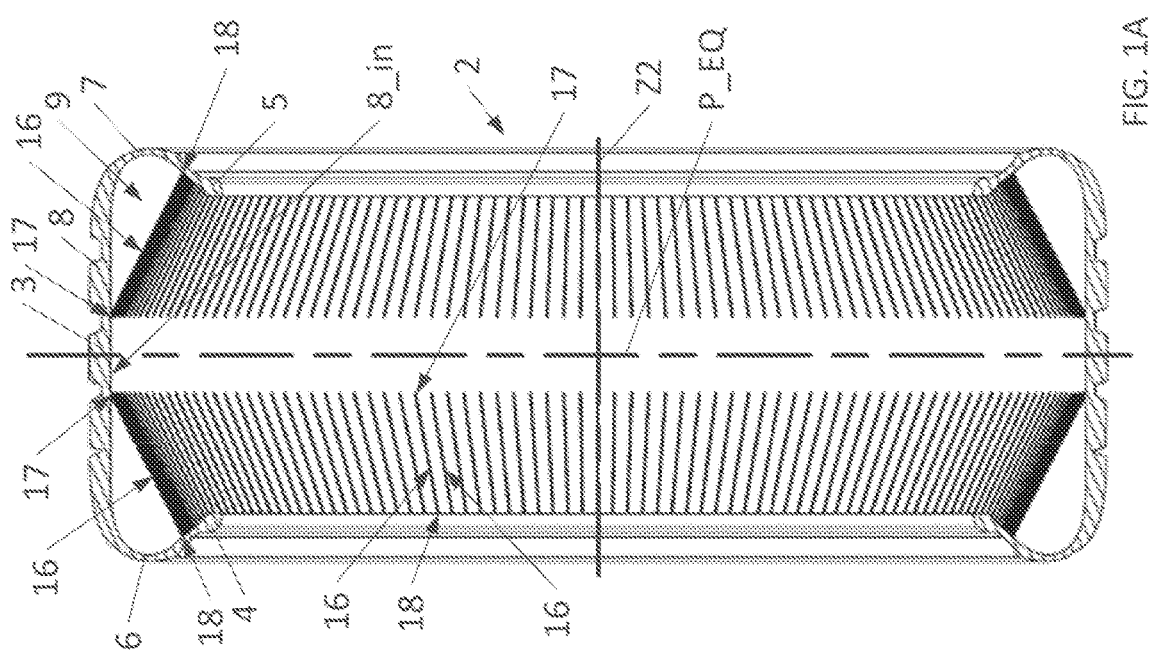
Figure 2B:
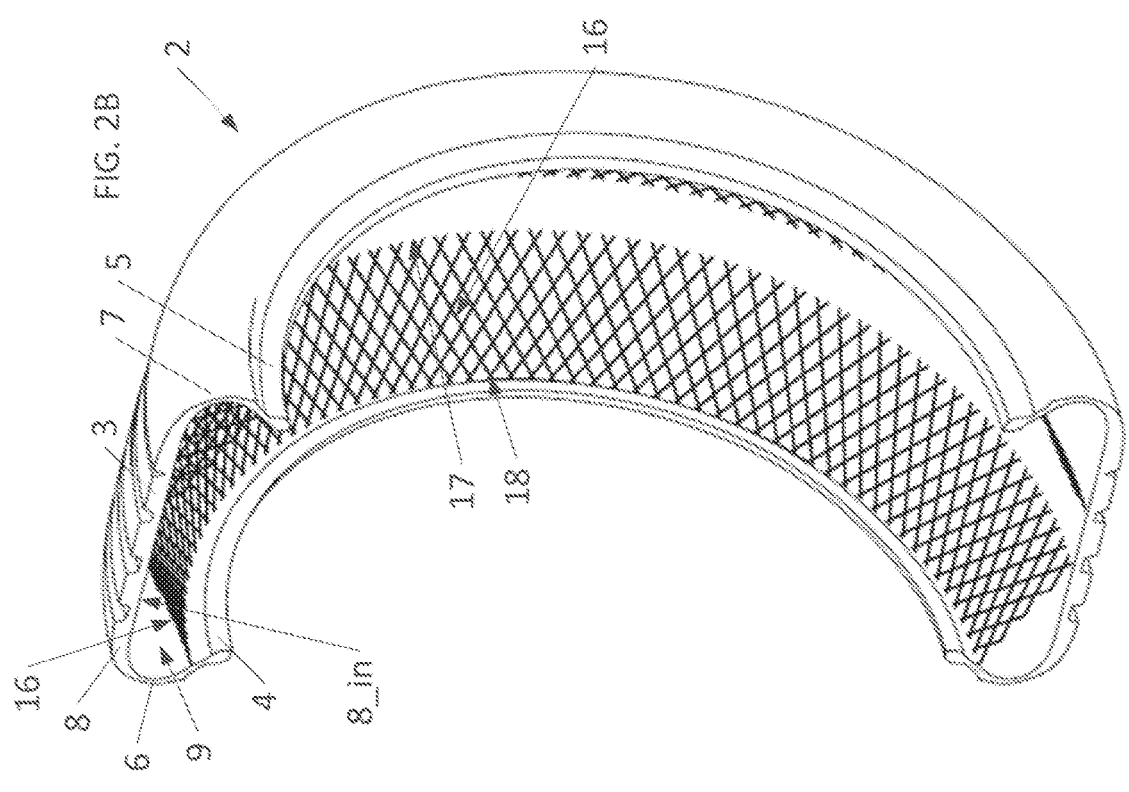
FIGS. 2A and 2B illustrate, in a cross-sectional view in a radial plane and a perspective view with cutaway along a radial plane respectively, another example of a stayed tire produced according to the disclosure, within which the crown and lateral anchor points of each stay are angularly offset azimuthally relative to each other about the central axis of the tire, and the tire also comprises, in each hemisphere of the tire, two sets of stays, the first of which has an angular offset of the anchor points in one direction and the second of which has an angular offset in the other direction, so that the stays in a single hemisphere are criss-crossed.
Figure 2A:
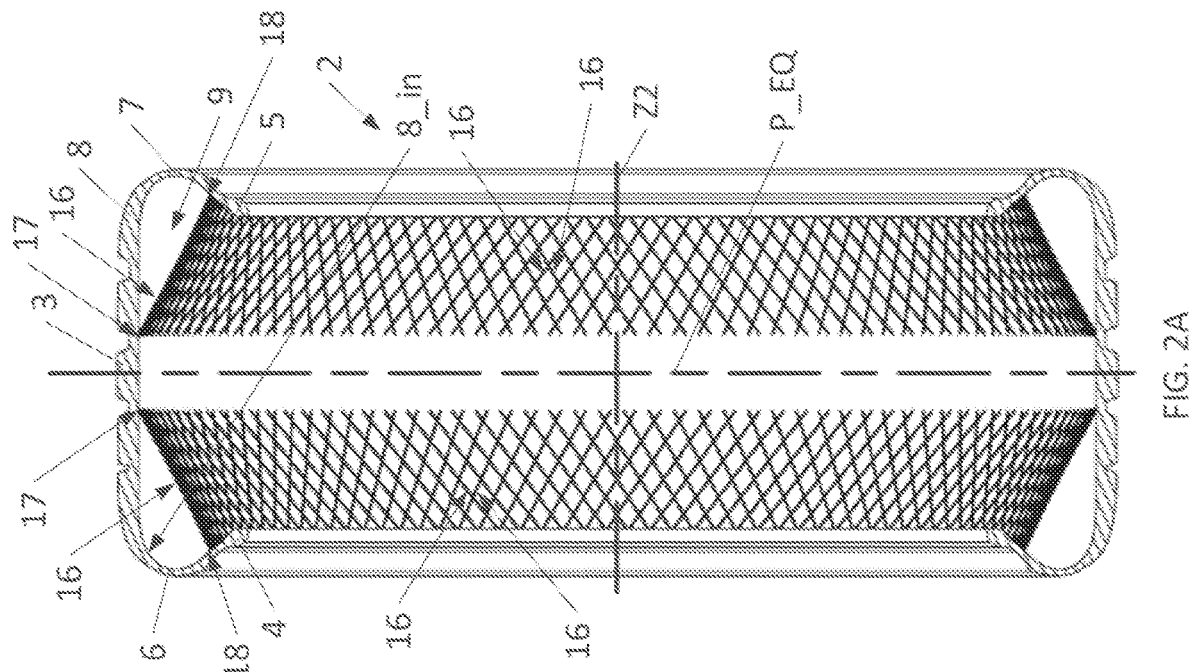
Figures 4A, 4B, 4C:
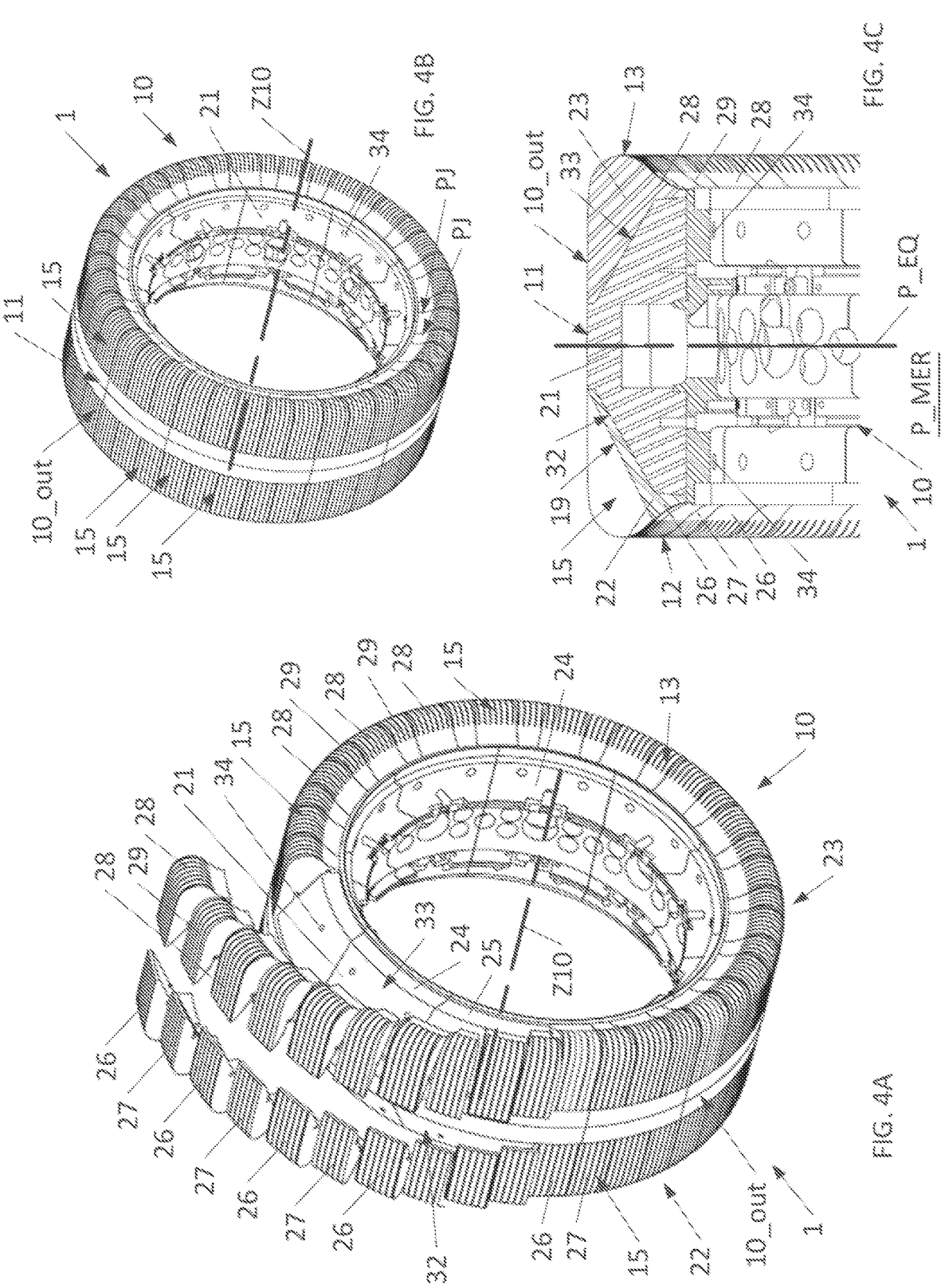
FIGS. 4A, 4B and 4C illustrate, in a partially exploded perspective view, an assembled perspective view and a detailed cross-sectional view in a radial plane respectively, a tool according to the disclosure comprising the central ring in FIGS. 3A and 3B on which are mounted two annular sub-assemblies referred to as "lugs" that are each suitable for receiving the components forming a sidewall of the tire, and which contain the passages for the stays, here in the form of grooves that are oriented along the radial planes to produce a tire as illustrated in FIGS. 1A and 1B. In order to facilitate the dismantling and extraction of the core from the tire, each lug is angularly sub-divided into sectors, alternately forming arch segments and keys. It will be noted that, for ease of depiction, the left- and right-hand halves in FIG. 4C correspond to cross-sections along two separate radial planes, slightly offset from each other azimuthally about the central axis of the core, so that the half situated here on the left of the equatorial plane is cut through the hollow part of a groove, while the half situated on the right of the equatorial plane is cut through the solid lateral wall that defines the groove.
Figures 5A, 5B, 5C:
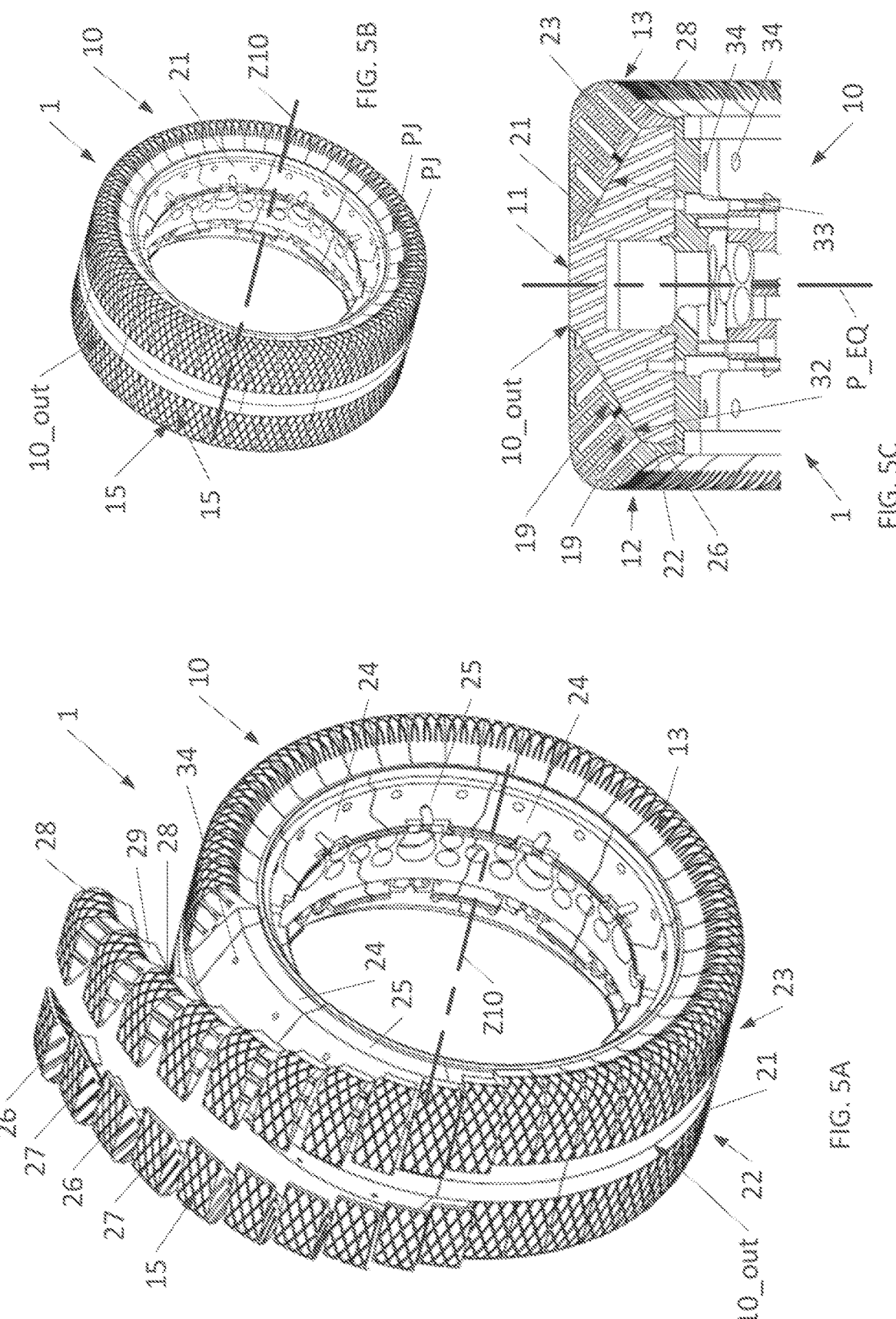
FIGS. 5A, 5B and 5C illustrate, in a partially exploded perspective view, an assembled perspective view and a detailed cross-sectional view in a radial plane respectively, a tool according to the disclosure comprising the central ring in FIGS. 3A and 3B on which are mounted two annular sub-assemblies referred to as "lugs" that are each suitable for receiving the components forming a sidewall of the tire, and which contain the passages for the stays, here in the form of criss-crossed grooves to produce a tire as illustrated in FIGS. 2A and 2B. As in the variant in FIGS. 4A to 4C each lug is angularly sub-divided into sectors, alternately forming arch segments and keys, in order to facilitate the dismantling and extraction of the core from the tire.

Preferably, as can be seen clearly in FIGS. 1A and 2A, the bead 4, 5 is situated axially set back from the axially most protruding portion of the corresponding sidewall 6, 7, that is, the bead 4, 5 is closer to the equatorial plane P_EQ than the sidewall 6, 7 to which the bead is connected. Between the crown 3 and the bead 4, 5, the sidewall 6, 7 thus forms, in cross-section in a meridian plane P_MER, a profile that is generally curved outwards and the end of which forming the bead 4, 5 is axially re-entrant, so that the cavity 9 is, in cross-section in the meridian plane, substantially in the shape of an (2 (uppercase omega).

According to the disclosure, the tool 1 comprises a toroidal core 10 having, about its central axis Z10, a convex outer surface 10_out, referred to as the "receiving surface" 10_out, that has a shape conjugate to the inner surface 8_in of the wall 8 of the tire and which comprises to this end a radially outer crown zone 11 suitable for receiving components forming the crown 3 of the tire 2 and, axially on either side of the crown zone, a first lateral zone 12 turned in towards the central axis Z10 of the core and suitable for receiving components forming the first sidewall 6 and the first bead 4, together with a second lateral zone 13 turned in towards the central Z10 axis and suitable for receiving components forming the second sidewall 7 and the second bead 5.

The core 10 thereby embodies a volume, referred to as the "reserved volume", which is externally delimited by the receiving surface 10_out and corresponds to the cavity 9 of the tire 2.

The core 10 can thus occupy, and therefore temporarily reserve, during the manufacturing of the tire, the volume the shape and dimensions of which correspond to those of the cavity 9, which volume will become the cavity 9 of the tire 2 when the core 10 has been removed from the tire 2 during the demolding operation that ends the manufacturing cycle of the tire 2.

It will be noted that, in practice, the central axis Z10 of the core 10, about which the core 10 forms a ring, will be coincident with the central axis Z2 of the tire 2 manufactured on the core 10. For the convenience of the description, either one can therefore be denoted by the expression "central axis".

According to the disclosure, the core 10 has a plurality of passages 15 that extend inside the reserved volume, below the receiving surface 10_out, and which open onto the receiving surface 10_out so that each of the passages 15 connects the crown zone 11 of the receiving surface 10_out to one of the first and second lateral zones 12, 13 so that the core 10 can receive, inside the passages 15, reinforcing elements 16, referred to as "stays" 16, which are designed to be permanently incorporated into the structure of the tire 2 and each extend in the cavity 9 of the tire, connecting a crown anchor point 17 situated in the crown 3 of the tire 2 to a lateral anchor point 18 situated in one of the sidewalls 6,7 or beads 4, 5 of the tire 2.

The passages 15 thus correspond to empty spaces that are made in the core 10, inside the reserved volume, so that they can receive the stays 16, and thus allow each stay 16 to pass through the receiving surface 10_out, a first time in order to enter the reserved volume, here through the lateral zone 12, 13 and a second time in order to exit the reserved volume, here in the crown zone 11, or vice versa.

The stays 16 can have different configurations, and in particular a variety of orientations, without departing from the scope of the disclosure.

According to one possible embodiment corresponding to FIGS. 1A and 1B, the crown and lateral anchor points 17, 18 of each stay 16 are thus situated at the same azimuth about the central axis Z2 of the tire, so that the stays 16 extend along radial planes containing the central axis Z2 of the tire.

According to another possible embodiment corresponding to FIGS. 2A and 2B, the crown and lateral anchor points 17, 18 of each stay 16 are angularly offset relative to each other azimuthally about the central axis Z2 of the tire, so as to create inclined stays 16. More preferably, the tire 2 can then comprise, in a single hemisphere, and preferably in each of its two hemispheres, two sets of stays 16, so that the stays 16 in the first set each have an angular offset in a first direction, for example in the clockwise direction, between their crown anchor point 17 and their lateral anchor point 18, while the stays 16 of the second set each have an angular offset in an opposite second direction, for example anti-clockwise, between their crown anchor point 17 and their lateral anchor point 18, so that the stays 16 of the first set and the stays 16 of the second set, in a single hemisphere, are criss-crossed.

Preferably, all of the lateral anchor points 18 of the stays 16 in a single hemisphere are situated at the same abscissa along the central axis Z2, that is, the stays 16 in a single hemisphere preferably emerge from the wall 8 of the tire 2 along a single imaginary line that corresponds to the intersection of the inner surface 8_in of the wall 8 and a plane normal to the central axis Z2.

The same applies, mutatis mutandis, to the crown anchor points 17 of the stays 16 in a single hemisphere, which are all preferably situated at the same abscissa along the central axis Z2, preferably separate from the abscissa of the lateral anchor points 18.

In addition, for a given stay 16, or even for all of the stays 16, the abscissa of the crown anchor point 17 is preferably closer to the equatorial plane P_EQ than the abscissa of the lateral anchor point 18.

In any event, that is, whether in the presence of stays 16 contained in radial planes as in FIG. 1A or in the presence of inclined and/or criss-crossed stays 16 as in FIG. 2A, each stay 16 is preferably contained in a single hemisphere, in that no stay 16 crosses the equatorial plane P_EQ inside the cavity 9 of the tire, that is, the lateral anchor point 18 and the crown anchor point 17 that form the two ends of a single section of stay 16 that extends continuously inside the cavity 9, and which therefore form the two successive points by which the stay 16 emerges from the wall 8 to pass through the cavity 9 and then leaves the cavity 9 to re-enter the wall 8 respectively, are both situated in the same hemisphere, on the same side of the equatorial plane P_EQ. This makes it possible in particular to simplify the structure of the tool 1 and the demolding operations.

Preferably, whether in the presence of stays 16 contained in radial planes as in FIG. 1A, or in the presence of inclined and/or criss-crossed stays 16 as in FIG. 2A, each stay 16 is suitable for working in tension, and therefore for connecting the crown anchor point 17 to the corresponding lateral anchor point 18 along a straight-line segment, that is geometrically forming a taut, or quasi-taut, chord below the arc that is formed by the inner surface 8_in of the wall 8 between the crown anchor point 17 and the lateral anchor point 18 in the tire 2 at rest, so that the stay 16 opposes the mutual separation of the anchor points 17, 18 from each other, and thus increases the lateral stiffness of the tire.

In addition, the stays 16 in a single set of stays are preferably evenly distributed azimuthally about the central axis Z2, at a constant repeating angular pitch P16.

This repeating angular pitch P16 is preferably between 0.5 degrees and 5 degrees, preferably between 0.75 degrees and 3 degrees, in particular between 1 degree and 3 degrees, and for example equal to 1.5 degrees. Each set of stays 16 can thus include between 72 stays and 480 or even 720 stays, preferably between 120 stays and 360 stays, and as a preferred example 240 stays.

These values of the repeating angular pitch P16 are in particular applied for tires 2 intended for passenger vehicles as defined in accordance with the European Tyre and Rim Technical Organisation, or ETRTO, 2020 standard, and particularly for tires intended to be mounted on a rim the mounting diameter of which is at least equal to 12 inches, preferably at least equal to 16 inches, and at most equal to 24 inches, preferably at most equal to 22 inches.

In practice, the repeating angular pitch P16 above makes it possible to obtain a satisfactory compromise between a number of stay's 16 that is both sufficiently large to obtain effective stiffening of the tire 2, even if one or more stays 16 break, and sufficiently moderate to make it possible to arrange a corresponding number of passages 15 in the core 10 without excessively weakening the structure of the core 10 or complicating the demolding operations.

By way of illustration, for the aforementioned diameters of tires 2, a repeating pitch P16 of 1.5 degrees positions one stay 16, and therefore one stay passage 15, every 5 mm to 10 mm, and for example approximately every 8 mm, with an arc length taken about the central axis Z2, Z10, at the maximum diameter of the inner surface 8_in of the wall 8 of the tire 2 or, in an equivalent manner, in the crown zone 11, at the maximum diameter of the outer surface of the core 10 forming the receiving surface 10_out.

Preferably, the stays 16 are made from one or more filamentary elements, the largest transverse dimension of which is at least ten times, at least twenty times, or at least fifty times smaller than the visible length of the portion of the stay 16 in question that extends in the cavity 9, that is, the length of the stay 16 between the crown anchor point 17 and the corresponding lateral anchor point 18.

The stays 16 can thus be formed from a single-strand or multi-strand thread, made from strands of a textile material, a polymer material such as aramid, or even a metallic material. According to one possible embodiment, the stays 16 are made from a composite thread made using fiberglass and resin.

Advantageously, regardless of the configuration of the stays 16, the core 10 according to the disclosure makes it possible to insert the stays 16 into the volume reserved by the core 10, and therefore into the space that will become the cavity 9 of the tire 2, prior to the formation of the tire 2, in a distribution and arrangement that substantially or even exactly correspond to the distribution and arrangement that the stays will have within the finished tire 2, ready to be mounted on the rim, as the stays 16 remain in place inside the cavity 9, in the desired position, and rigidly connected to the tire 2, when the core 10 is removed. The use of a core 10 according to the disclosure therefore ensures that the tire 2 will have a well-controlled configuration that is reproducible from one tire 2 to another.

In addition, as the stays 16 are thus sheltered in the passages 15 of the core 10 during the laying of the components forming the wall 8 of the tire, there is no risk of accidentally moving, pulling out or damaging the stays 16 during the process of manufacturing the wall 8 of the tire 2.

In absolute terms, it could be envisaged that all or part of the core 10, and in particular the portions of the core 10 that temporarily fill the cavity 9 of the tire and define the passages 15, be made from a material that is soluble, fusible, vaporizable (sublimable) or can otherwise be broken down without damaging the tire 2, so that the portions of the core can be destroyed on command after manufacturing and curing of the tire 2, and discharged in fluid or fine-grained granular form during demolding, without damaging the tire 2 or in particular the stays 16. A core 10 could thus be used that forms, by analogy with casting, a partially or fully lost pattern, replaced for each manufacturing cycle, in order in particular to facilitate demolding. Within such a core forming a partially or fully lost pattern, the passages 15 could optionally have a tubular shape, the transverse cross-section of which was closed around the stay 16 at least over a portion of the free length of the stay, or even over the whole of the free length of the stay 16, that is, from the lateral anchor point 18 to the crown anchor point 17.

However, particularly preferably, the passages 15 are arranged in demoldable open shapes, making it possible to produce a permanent, reusable core 10 that can be extracted from the tire 2, after the tire 2 has been manufactured, without damage to the stays 16, and then reused to manufacture the next tire.

As such, the passages 15 for stays 16 are preferably formed by grooves 15 that are hollowed out from the receiving surface 10_out in the thickness of the reserved volume so that they have a continuous opening along the profile of the receiving surface 10_out, from the crown zone 11 to the lateral zone 12, 13 in question.

Advantageously, as each groove 15 creates, on the receiving surface 10_out, a slot-type opening that extends over the entire length of the receiving surface 10_out going from the lateral anchor point 18 of the stay 16 in question to the crown anchor point 17 of the stay 16, it is possible to engage the stay 16 in the passage, before the components forming the wall 8 of the tire 2 are laid, simply by sliding the stay 16 into the groove 15, from the outside of the core 10, so that the stay passes through the receiving surface 10_out to sink into the reserved volume, towards the central axis Z10 of the core.

Advantageously, after the components forming the wall 8 of the tire 2 have been laid on the receiving surface 10_out, so that the wall 8 covers the grooves 15, it will be possible to extract the core 10 from the inside of the tire 2, thus gradually revealing the stays 16, now fastened to the wall 8 and therefore incorporated into the tire 2, through the openings of the grooves 15 of the core being disengaged, and thus leaving the stays 16 in their permanent place in the cavity 9 of the tire 2.

For the convenience of the description, and so that the figures are not cluttered, the passages 15 for stays 16 and the grooves 15 that constitute a preferred specific shape of the passages 15 for stays 16 will be denoted by the same reference 15.

Preferably, as can be seen in particular in FIGS. 4C, 5C, 6C, 7C, 8C, 9C, 11C, 12C, 13C, 14C, 15B, 18A, 20A, 21A and 24, the grooves 15 are blind, that is, the grooves 15 have a solid bottom 19, situated below the receiving surface 10_out, in the reserved volume, which solid bottom 19 extends from a first mouth of the groove 15, which opens onto the lateral zone 12, 13 of the receiving surface 10_out, to a second mouth of the groove 15, which opens onto the crown zone 11 of the receiving surface 10_out.

When it is in place in the groove 15, the stay 16 is thus radially situated, and more particularly is radially contained, relative to the central axis Z10 of the core, between the bottom 19 and the opening of the groove 15 situated on the receiving surface 10_out. The stay 16 can either be detached "above" the bottom 19, that is, situated at a non-zero radial distance from the bottom 19, beyond the bottom 19 relative to the central axis Z10, or be resting on the bottom 19, which will then advantageously act as a guide and support for the stay 16 during the manufacturing of the tire 2.

Preferably, the depth of the passages 15, and more particularly the depth of the grooves 15, relative to the receiving surface 10_out, and therefore more particularly the distance separating the bottom 19 of the groove 15 from the receiving surface 10_out, is sufficient so that each of the passages 15 can allow the stay 16 to follow, within the passage 15, a path that directly connects the lateral anchor point 18 to the crown anchor point 17 along a straight-line segment. The stay 16 can thus adopt its functional configuration within the passage 15, here within the groove 15, without interfering with or being deformed or deviated by the passage 15, according to which functional configuration the stay 16 forms a chord that connects, by the shortest path, the ends of the arc described by the wall 8 of the tire between the lateral anchor point 18 and the crown anchor point 17, so that once the tire 2 has been released from the core 10, the stay 16 can work effectively in tension, like a tie-rod, between the lateral anchor point 18 and the crown anchor point 17.

The passages 15, here the grooves 15, will of course be distributed, preferably evenly distributed, azimuthally about the central axis Z10 at the desired repeating angular pitch P16 for the stays 16 as described above, and for example at a constant repeating angular pitch P16 equal to 1.5 degrees.

The width W15 of the groove 15 is preferably selected as a function of a compromise between i) taking into account the width (diameter) of the stay 16, the need to provide a functional clearance between the stay 16 and the lateral walls that define the groove 15, which functional clearance is sufficient to make it possible to insert the stay 16 into the groove 15 and then extract the core 10 from the tire 2, and therefore extract the stay 16 from the groove 15 without trapping and without damage to the stay 16, and ii) maintaining an opening and a groove width W15 sufficiently narrow so as not to weaken the core 10 and to provide a high quality support for the components of the tire 2 laid on the receiving surface 10_out, and limit if possible the penetration, and therefore the deformation or creep, of the materials forming the components of the tire 2 into the grooves 15.

As such, the width W15 of the groove 15, and in particular the width of the opening of the groove 15 on the receiving surface 10_out, is preferably between 1.01 times and 1.5 times the corresponding dimensions of the transverse cross-section of the stay 16, and more preferably the largest dimension of the transverse cross-section of the stay. In practice, if the stay is formed by a single-strand or multi-strand thread with a substantially circular cross-section, then the dimension of the transverse cross-section of the stay taken into consideration is the diameter of the circular cross-section of the thread.

Preferably, for the same reasons, and in particular if stays 16 are envisaged the cross-section of which has a diameter of between 0.25 mm and 2 mm, for example of the order of 1 mm, a groove width W15 is selected that is, in particular at the opening on the receiving surface 10_out, between 0.1 mm and 3 mm, preferably between 0.3 mm and 2.2 mm, and for example between 1 mm and 1.8 mm.

Preferably, all of the grooves 15 in a single hemisphere of the core 10, and more preferably all of the grooves 15 of the core 10 have an identical width W15.

According to one possible embodiment, the grooves 15 are generated along radial planes containing the central axis Z10, as is the case in FIGS. 4A to 4C, 6A to 6C, 7A to 7C, 8A to 8C, 9A to 9C, 10, 20A to 20F, 21A to 21C and 23, so as to make it possible to place stays 16 extending along the radial planes within the tire 2, as is the case for the tire in FIGS. 1A and 1B.

Each groove 15 is therefore contained in a radial plane that forms the sagittal meridian plane of the groove 15, that is, that intersects the middle of the azimuthal angular sector occupied by the groove. The sagittal meridian planes of each of the two grooves 15 immediately adjacent to the groove 15 in question are angularly distant from the sagittal meridian plane of the groove 15 in question by a value equal to the repeating angular pitch P16 of the grooves 15 and therefore ultimately equal to the repeating angular pitch P16 of the stay's.

If applicable, each groove 15 according to this arrangement can be generated by a saw cut centered on and parallel to the sagittal meridian plane of the groove, and having a constant width equal to the desired width W15 of the groove 15.

According to another possible embodiment, the grooves 15 are criss-crossed so as to describe a grid on the receiving surface 10_out, as is the case in FIGS. 5A to 5C, 11A to 11C, 12A to 12C, 13A to 13D, 14A to 14D, 15A to 15C, 17, 18A and 18B, 19, and 22A to 22C, in order to make it possible to place crossed stays 16 within the tire 2, as is the case for the tire in FIGS. 2A and 2B.

By analogy and for the convenience of the description, and although the receiving surface 10_out forms a non-developable surface (skew surface) and therefore all the more so a non-flat surface, the units of the grid, that is, the base units or "blocks", here substantially rhomboid (that is, substantially diamond-shaped), described by the openings of the criss-crossed grooves 15 on the receiving surface 10_out, can be denoted as "quadrilaterals", and the columns of material of the core 10 that remain between the consecutive criss-crossed grooves 15 can be denoted as "prisms" 20, the base of these prisms 20 corresponding to the aforementioned quadrilaterals, and the faces thereof forming the lateral walls that define the grooves 15.

According to a preferred feature that can be applied regardless of the nature and shape of the passages 15 for stays, but which is particularly beneficial if the passages 15 for stays are formed by grooves 15, the core 10 comprises, as can be seen in particular in FIGS. 4A, 4C, 5A, 5C, 6A, 6C and 23, an assembly of a plurality of annular sub-assemblies 21, 22, 23 comprising:

i) a first annular sub-assembly 21 referred to as the "central ring" 21, which forms a central portion of the crown zone 11 of the receiving surface 10_out, which central portion of the crown zone 11 is suitable for receiving one or more components forming the crown 3 of the tire 2, ii) a second annular sub-assembly 22 referred to as the "left lug" 22, which is axially adjacent to the central ring 21, the left lug 22 comprising the first lateral zone 12 of the receiving surface 10_out as well as a portion of the crown zone 11 that axially extends the central portion of the crown zone 11 on the corresponding side of the central ring 21, and the left lug 22 containing the grooves 15 forming the passages for the stays 16 that connect the first sidewall 6 of the tire to the crown 3 of the tire, and iii) a third annular sub-assembly 23 referred to as the "right lug" 23, which is axially adjacent to the central ring 21, on the side of the central ring 21 that is axially opposite the side receiving the left lug 22, the right lug 23 comprising the second lateral zone 13 of the receiving surface 10_out as well as a portion of the crown zone 11 that axially extends the central portion of the crown zone 11 on the corresponding side of the central ring 21, and the right lug 23 containing the grooves 15 forming the passages for the stays 16 that connect the second sidewall 7 of the tire to the crown 3 of the tire.

The left lug 22, the central ring 21 and the right lug 23 are coaxial and centered on the central axis Z10.

The terms "left" and "right" are used for the convenience of the description, for the sole purpose of making a distinction between the lugs 22, 23 when necessary, and do not of course prejudge in any way the direction of mounting of the tire 2 on the rim and/or the vehicle.

Preferably, the central ring 21 is not provided with passages 15 for stays 16, and can thus preferably have a solid outer surface, which forms an annular central island separating the respective grooves 15 of the left lug 22 and the right lug 23. Advantageously, such an arrangement facilitates demolding, and further makes it possible to pass the stays 16 locally on the outside of the central ring 21, and therefore on the radially outer side of the core 10, on the receiving surface 10_out that receives the components of the wall 8 of the tire, which makes it possible to easily incorporate the corresponding portion of the stays 16 into the wall 8 and therefore ensure that the stays are anchored in the crown 3 of the tire 2.

Preferably, the crown portion of the central ring 21 forms a right cylinder with a circular base, centered on the central axis Z10.

In addition, preferably, the equatorial plane P_EQ is contained in the axial range covered by the central portion of the crown zone 11 of the central ring 21, and more particularly is situated in the middle of the axial range, so that it sub-divides the central portion of the crown zone 11, and more generally the central ring 21, into two parts that are equal or even symmetrical to each other, relative to the equatorial plane P_EQ.

The lugs 22, 23 have, in cross-section in a radial plane, a convex curved outer profile that provides a curved transition between the crown zone 11 and the corresponding lateral zone 12, 13 of the receiving surface 10_out, and the curvature of which follows the curvature of the hollow of the cavity 9 of the tire 2, and more particularly the curvature of the inner surface 8_in of the wall 8 of the tire at the transition between the crown 3 and the sidewall 6, 7, as well as in the zones where the wall 8 describes the axially outermost points of the sidewalls 6, 7. The lug 22, 23 thereby forms a lobe that can occupy, temporarily fill and therefore shape the hollow of the cavity 9 of the tire 2, during the manufacturing of the tire 2.

It will be noted in this regard that, due to the concavity of the cavity 9 and the axial narrowing formed by the beads 4, 5 relative to the sidewalls 6, 7, the beads 4, 5 are radially in line with the lugs 22, 23, so that the lugs 22, 23 form portions of the core 10 that cannot be demolded in a strictly radial extraction movement.

As indicated above, in order to simplify the demolding operation, a single-use left lug 22 and/or right lug 23 could be used, made from a soluble, fusible, sublimable, etc. material, which would thus form lost parts of the core 10, replaced for each new cycle for manufacturing a tire 2. Such lost parts could be mounted on a reusable central ring 21.

However, the lugs 22, 23, like the central ring 21, are preferably reusable from one manufacturing cycle to another, and to this end made from a durable material such as an aluminium alloy.

To this end, an arrangement of the tool 1 is provided that is suitable for the dismantling of the core 10, and more particularly the dismantling of the sub-assemblies 21, 22, 23, from the inside of the tire 2.

Preferably, as can be seen in particular in FIGS. 3A, 4A, 5A, 6A and 10, the annular sub-assemblies 21, 22, 23, namely the central ring 21, the left lug 22 and the right lug 23, are each angularly split into sectors 24, 25, 26, 27, 28, 29, azimuthally about the central axis Z10, with alternating sectors referred to as "keys" 24, 26, 28, designed to be accessible radially from the inside and to be removed first on the dismantling of the sub-assembly 21, 22, 23 in question, and sectors referred to as "arch segments" 25, 27, 29, supported and locked in position by the keys 24, 26, 28, and designed to become maneuverable after they have been released by the removal of the keys 24, 26, 28.

As can be clearly seen in FIGS. 3A and 3B, the central ring 21 is thus sub-divided into a plurality of ring keys 24 and ring arch segments 25.

The number of ring keys 24, equal to the number of ring arch segments 25, is selected to be sufficiently high to allow easy splitting and dismantling by centripetal radial extraction of the sectors 24, 25 forming the central ring 21, and yet sufficiently moderate so that the sectors 24, 25 are not unnecessarily numerous, and therefore so that the assembly of the sub-assembly 21 forming the central ring 21 is simplified. As such, the number of ring keys 24, and therefore the number of ring arch segments 25, will preferably be between 4 and 6, and more preferably equal to 5, as is the case in FIGS. 3A and 3B.

For the sake of standardization and ease of assembly, all of the ring keys 24 are preferably identical, and therefore interchangeable. Likewise, all of the ring arch segments 25 are preferably identical, and therefore interchangeable.

Preferably, the lateral faces that define each ring key 24 and that form the parting lines of the ring key 24 with the two ring arch segments 25 adjacent to the ring key 24, are parallel to each other and parallel to the sagittal meridian plane of the ring key 24 in question. In a preferred variant, the lateral faces each form a non-zero taper angle, preferably between 1 and 2 degrees, for example equal to 1.5 degrees, relative to the sagittal meridian plane, so that the two lateral faces form secant planes that flare, that is, that move away from each other obliquely, and that each move away from the sagittal meridian plane, as they radially approach the central axis Z10, the secant planes forming between them an opening angle that is equal to the sum of the respective taper angles of the lateral faces, here for example an opening angle of 3 degrees if each face has a taper angle of 1.5 degrees. Such an arrangement, whether with parallel lateral faces (which amounts to a zero taper angle) or tapered lateral faces (with a non-zero taper angle), advantageously allows the centripetal radial extraction of the ring key 24 relative to the ring arch segments 25 on either side of the ring key 24, the extraction taking place by "plane on plane" sliding of the ring key 24 against the ring arch segments 25 on either side of it, strictly in the case of exactly parallel lateral faces, and with a slight dislocation in the case of tapered lateral faces.

The ring arch segments 25 of course form sectors that complement the ring keys 24, and are locked in position by the ring keys 24 within the annular sub-assembly 21 forming the central ring 21. By analogy with the field of architecture, the ring keys 24, which are positioned and held by a common support (not shown), therefore make it possible to prevent the ring arch segments 25, and more generally the arc formed by the succession of the keys 24 and arch segments 25, from collapsing. The greater the taper angle of the lateral faces of the ring keys 24, the more robust and stable the support provided by the ring keys 24.

In order to dismantle the central ring 21 and extract it from the tire 2 during the demolding operation, the ring keys 24 are first extracted, in a centripetal radial extraction movement, followed by an axial disengagement movement, which has the effect of releasing the ring arch segments 25, which are then extracted in turn by a centripetal radial extraction movement, followed by an axial disengagement movement.

In order to allow the centripetal radial extraction of the ring keys 24 and then the ring arch segments 25 relative to the lugs 22, 23 while the lugs 22, 23 are still retained in the cavity 9 of the tire 2, the central ring 21 preferably comprises, on either side of the central portion of the crown zone 11, a first taper face 32 supporting the left lug 22 and a second taper face 33 supporting the right lug 23.

The first and second taper faces 32, 33 preferably form a first bevel 32 and a second bevel 33 respectively, which are radially closer to the central axis Z10 than the passages 15 for the stays 16 and which form, with the central portion of the crown zone 11, a convex profile, in cross-section in a radial plane containing the central axis Z10, as can be seen in FIGS. 4C, 5C, 6C and 24.

Within the core 10 assembled and used to build the tire 2, the central ring 21 is contained in a space that is radially set back from the stays 16, and set back from the lugs 22, 23, and the sectors 24, 25 of the central ring 21 can perform, after curing of the tire 2 and while the lugs 22, 23 are still captive in the tire 2, a centripetal radial extraction movement without interfering with the lugs 22, 23 still in place in the cavity of the tire 2.

In order to prevent the walls of the grooves 15 from rubbing excessively against the stays 16 or pulling out the stays during the extraction of the lug sectors 26, 27, 28, 29, and more particularly during the extraction of the lug keys 26, 28, the lug sectors 26, 27, 28, 29 each cover an angular sector about the central axis Z10 that is relatively small and yet sufficiently large to limit the number of lug sectors 26, 27, 28, 29 to be assembled to produce each lug 22, 23.

In addition, for the sake of standardization and for ease of assembly, provision is preferably made for each lug key 26, 28 of a lug 22, 23 to occupy an angular sector A26 the value of which is a whole divisor of 360 degrees, and preferably the value of which is equal to that of the angular sectors occupied by the other keys 26, 28 of the same lug.

Likewise, each arch segment 27, 29 of a lug 22, 23 preferably occupies an angular sector A27 the value of which is a whole divisor of 360 degrees, and preferably the value of which is equal to that of the angular sectors occupied by the other arch segments 27, 29 of the same lug 22, 23.

Figures 9A, 9B, 9C, 10:
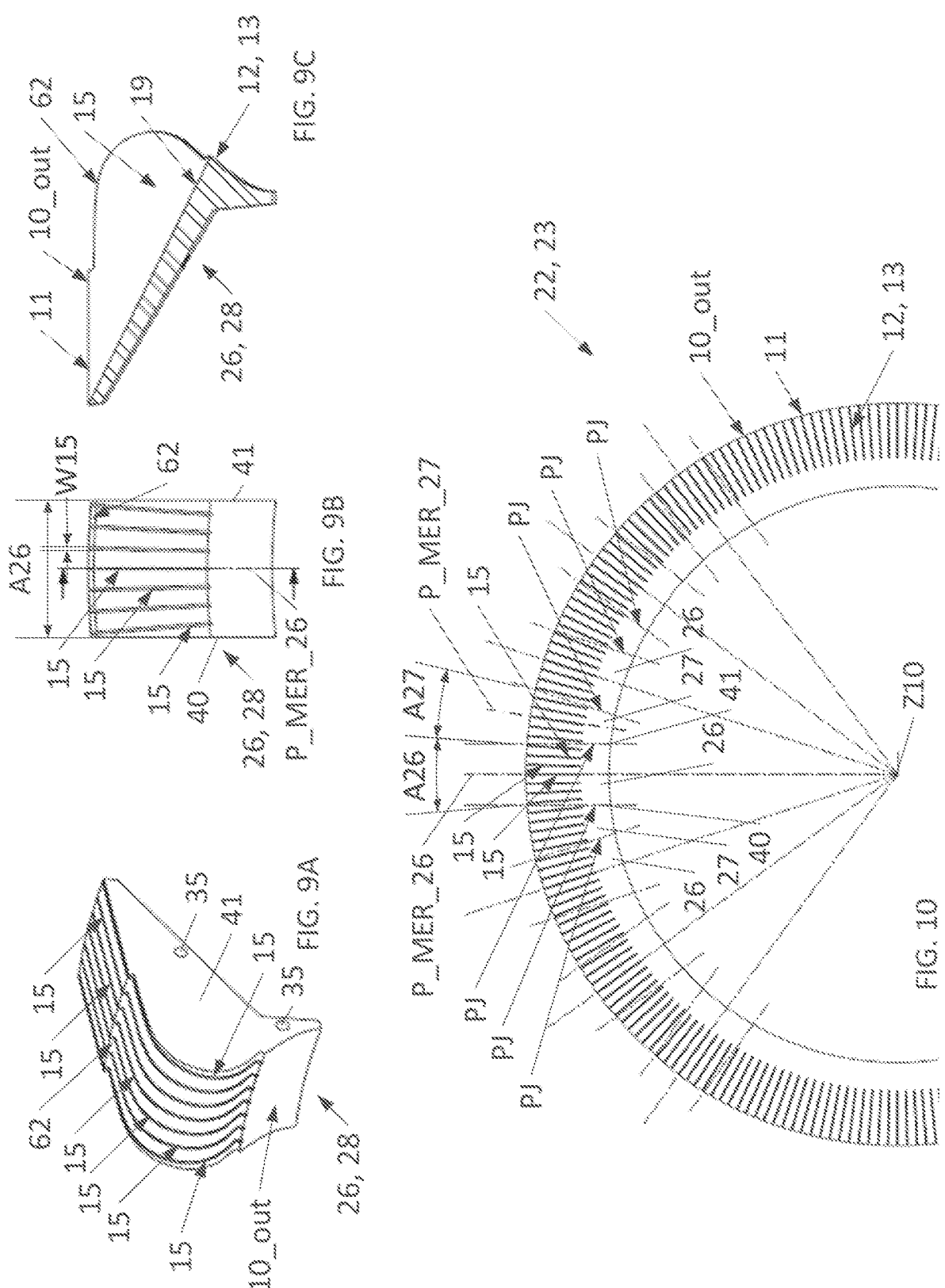
FIGS. 9A, 9B and 9C illustrate, in a perspective view, a front view projected in a plane normal to the central axis of the core, and a cross-sectional view in a sagittal meridian plane corresponding to the radial plane that passes through the middle of the corresponding sector respectively, a variant of the key in FIGS. 7A to 7C provided with an indentation suitable for receiving and positioning a masking shell covering the grooves.
FIG. 10 illustrates, in a partial front view projected in plane normal to the central axis of the core, an annular lug resulting from the assembly of the lug keys in FIGS. 7A to 7C and the lug arch segments in FIGS. 8A to 8C.

Preferably, the angular sector A26 covered by each lug key 26, 28, considered relative to the central axis Z10 and at the radially outermost level of the receiving surface 10_out of the lug key 26, 28 in question, as can be seen in particular in FIG. 10, is preferably equal to or greater than 9 degrees, and preferably less than or equal to 36 degrees, and more preferably equal to or less than 24 degrees, and even more preferably equal to or less than 18 degrees.

In absolute terms, an angular sector A26 equal to 9 degrees, 15 degrees, 18 degrees or even 24 degrees could be provided, the value of 9 degrees being preferable however in light of the dimensions of the tires 2 envisaged, and more particularly in light of the corresponding maximum diameter of the receiving surface 10_out, as well as in light of the repeating angular pitch P16 selected (here preferably 1.5 degrees).

Likewise, the angular sector A27 covered by each lug arch segment 27, 29, at the maximum diameter of the receiving surface 10_out, is preferably equal to or greater than 9 degrees, and preferably less than or equal to 36 degrees, and more preferably equal to or less than 24 degrees, and even more preferably equal to or less than 18 degrees, and for example selected from 24 degrees, 18 degrees, 15 degrees and, more preferably, 9 degrees.

Preferably, in particular in order to simplify the fastening of the lug sectors 26, 27, 28, 29 to the central ring 21, the sectoral division of the left lug 22 is identical to and azimuthally coincident with the sectoral division of the right lug 23, so that each key 26 of the left lug 22 is situated facing a key 28 of the right lug 23, and is angularly superposed thereon in projection in the equatorial plane P_EQ and, likewise, each arch segment 27 of the left lug 22 is situated facing and angularly superposed on the corresponding arch segment 29 of the right lug 23.

It will be noted that the optional implementation of angular sectors A26, A27 of 36 degrees each would result here in the angular division of the lugs 22, 23 coinciding exactly with the angular division of the central ring 21.

In addition, independently of or in combination with the aforementioned absolute values of the angular sectors A26, A27, and taking into account in particular the values of the repeating angular pitch P16 envisaged for the stays 16 and therefore for the grooves 15, the number of grooves 15 per lug key 26, 28 and lug arch segment 27, 29 respectively is consequently limited, in particular so that it is possible to disengage the lug key 26, 28 simultaneously from all of the stays 16 that it contains, without damaging the stays, taking advantage if applicable of a certain flexibility and/or relatively slack state of the stays 16 following the curing operation.

Figures 7A, 7B, 7C, 8A, 8B, 8C:
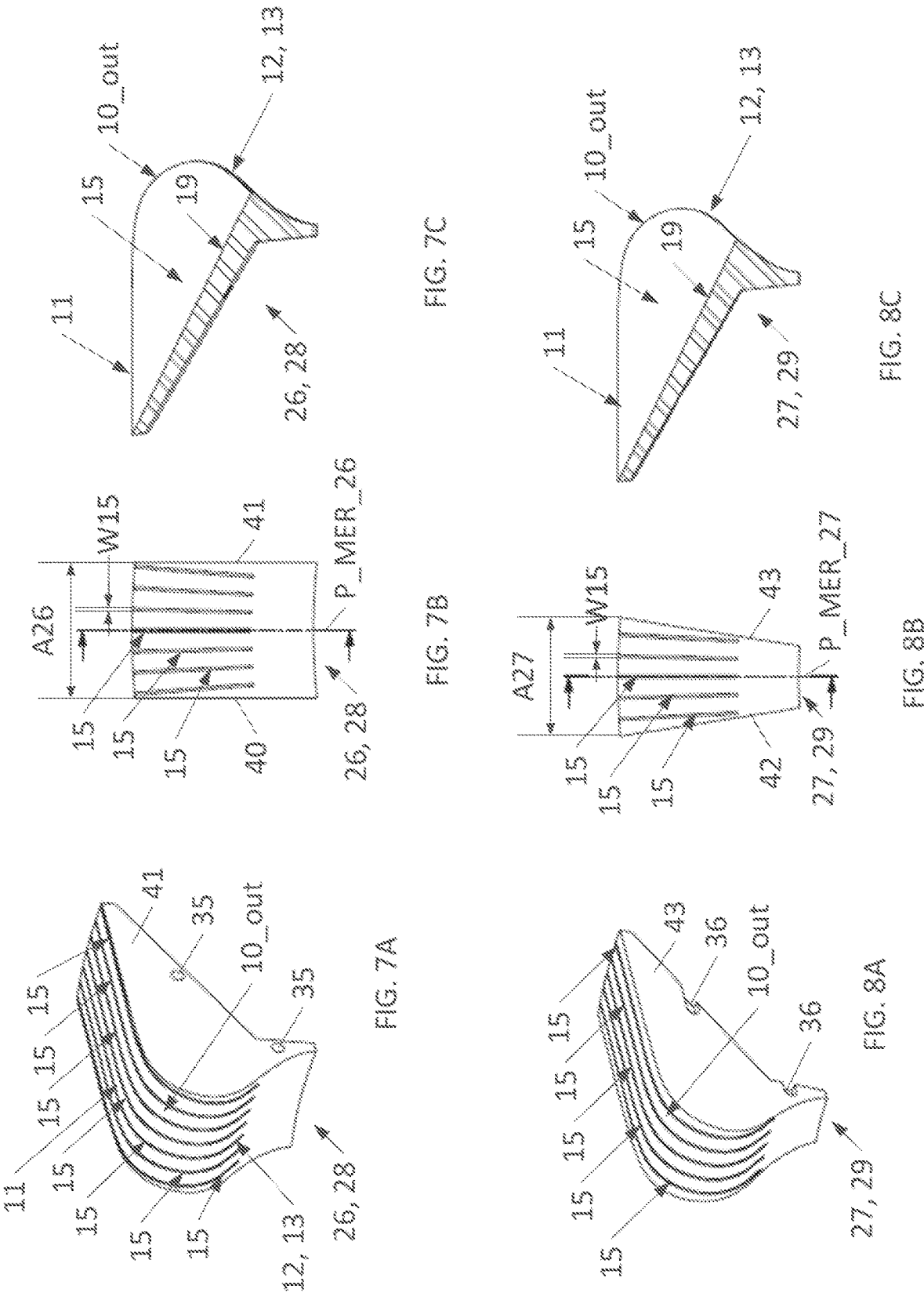
FIGS. 7A, 7B and 7C illustrate an exemplary embodiment of a lug key provided with radial grooves and the parting lines of which are parallel to the sagittal meridian plane of the lug, that is, the radial plane that passes through the middle of the corresponding sector, in a perspective view, a front view projected in a plane normal to the central axis of the core, and a cross-sectional view in the sagittal meridian plane respectively.
FIGS. 8A, 8B and 8C illustrate an example of a lug arch segment that complements the lug key in FIGS. 7A to 7C, in a perspective view, a front view projected in a plane normal to the central axis of the core, and a cross-sectional view in a sagittal meridian plane of the lug arch segment respectively, that is, in a radial plane that passes through the middle of the corresponding sector.

By way of illustration, for an arrangement of the grooves 15 along radial planes, there are preferably between 5 and 23 grooves 15 per lug key 26, 28, preferably between 5 and 9 grooves per lug key 24, and more preferably 7 grooves per lug key 26, 28 as illustrated in FIGS. 7B, 9B and 10.

The corresponding lug arch segments 27, 29 can preferably have between 3 and 21 grooves 15, preferably between 3 and 7 grooves 15, and for example 5 grooves 15, as illustrated in FIGS. 8B and 10.

In the example in FIG. 10, twenty lug keys 26 each occupying an angular sector A26 with a value of 9 degrees and each provided with seven grooves contained in radial planes, and twenty conjugate lug arch segments 27 each occupying an angular sector A27 with a value of 9 degrees and each provided with five grooves contained in radial planes, are used to form a lug 22, 23. The flanks 40, 41 of the lug keys 26 are parallel to each other, and parallel to the sagittal meridian plane P_MER_26 of each lug key 26 in question, while the flanks 42, 43 of the lug arch segments 27 form an angle of 18 degrees between them, and each form an angle of 9 degrees relative to the sagittal meridian plane P_MER_27 of the lug arch segment 27 in question.

If the grooves 15 are inclined and crossed, as is the case in FIGS. 11B, 12B, 13B and 14B, between four and eight entrances to grooves 15, corresponding to as many lateral anchor points 18, can be provided per lug sector 26, 27, 28, 29, both per lug key 26, 28 and per lug arch segment 27, 29, and more preferably six entrances to grooves 15, as shown in the FIGS. 11B, 12B, 13B and 14B, in which each sector comprises three entrances to grooves 15 inclined to the left (that is, in an anti-clockwise direction) in projection in a plane normal to the central axis Z10 and three entrances to grooves inclined to the right (that is, in a clockwise direction) in projection in the plane normal to the central axis Z10.

Preferably, the lug keys 26, 28 are identical and interchangeable at least within a single lug 22, or can even be switched between one lug 22 and the other lug 23.

Likewise, the lug arch segments 27, 29 are preferably identical and interchangeable at least within a single lug 22, or can even be switched between one lug 22 and the other lug 23.

Preferably, the lug arch segments 27, 29, and more preferably only the lug arch segments 27, 29 (and not the lug keys 26, 28), are fastened to the central ring 21, and more particularly to the taper faces 32, 33, by means of screws, which screws are inserted centrifugally radially from the empty inner space of the central ring 21, in order to engage with the radially inner face of the lug arch segments 27, 29, and the through-holes 34 for which in the central ring 21 can be seen in FIGS. 3A, 3B, 4A, 4C, 5A, 5C, 6A and 6C.

Figures 11A, 11B, 11C, 12A, 12B, 12C:
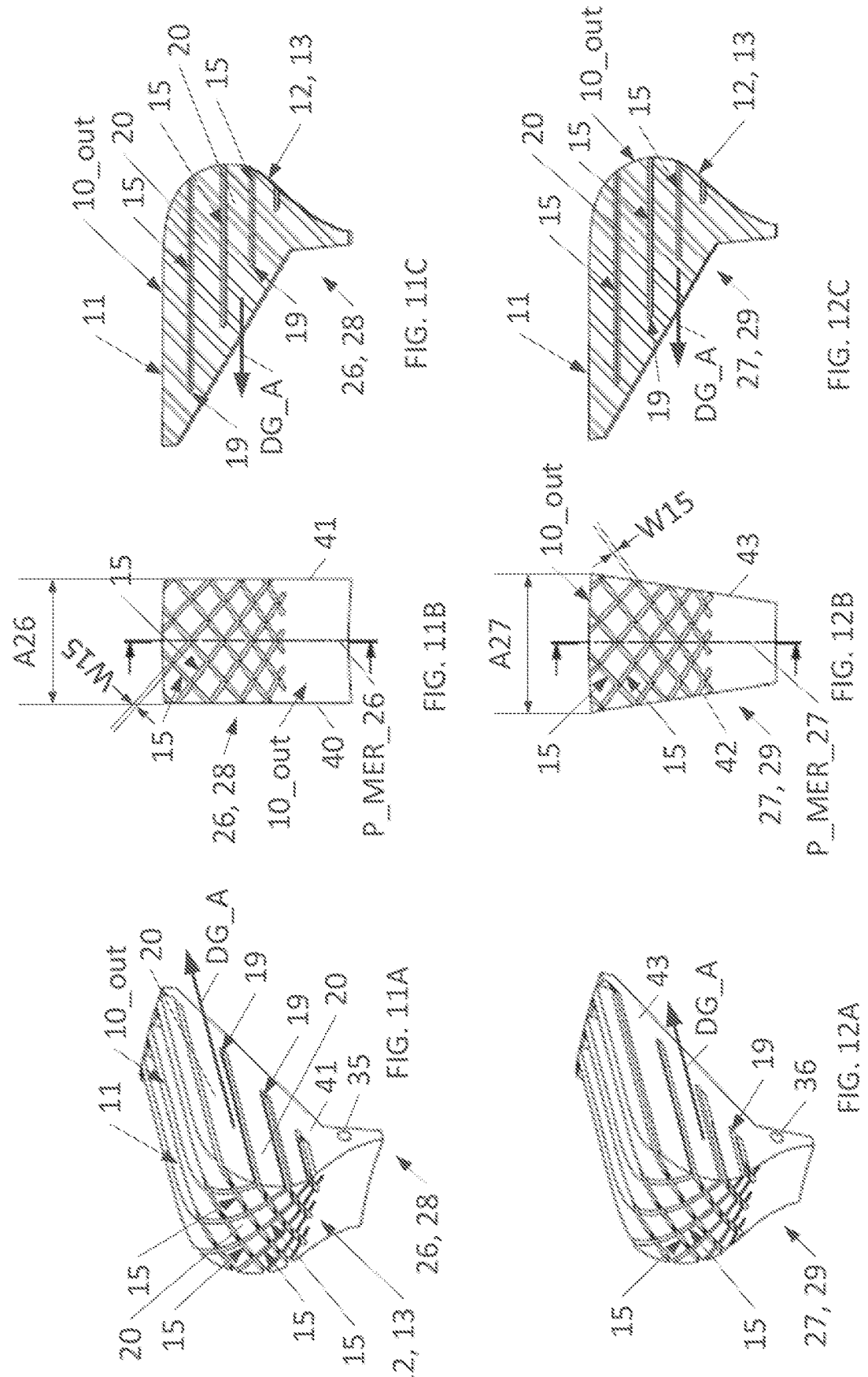
FIGS. 11A, 11B and 11C illustrate, in a perspective view, a front view projected in a plane normal to the central axis of the core, and a cross-sectional view in a sagittal meridian plane respectively, a lug key having cross-crossed grooves that are suitable for criss-crossed stays, the grooves being delimited by lateral walls that are generated in an axial generative direction, vectorially collinear with the central axis, that is, parallel to the central axis.
FIGS. 12A, 12B and 12C illustrate, in a perspective view, a front view projected in a plane normal to the central axis of the core, and a cross-sectional view in a sagittal meridian plane respectively, a lug arch segment with criss-crossed grooves that complements the key in FIGS. 11A to 11C.
Figures 21A, 21B, 21C:
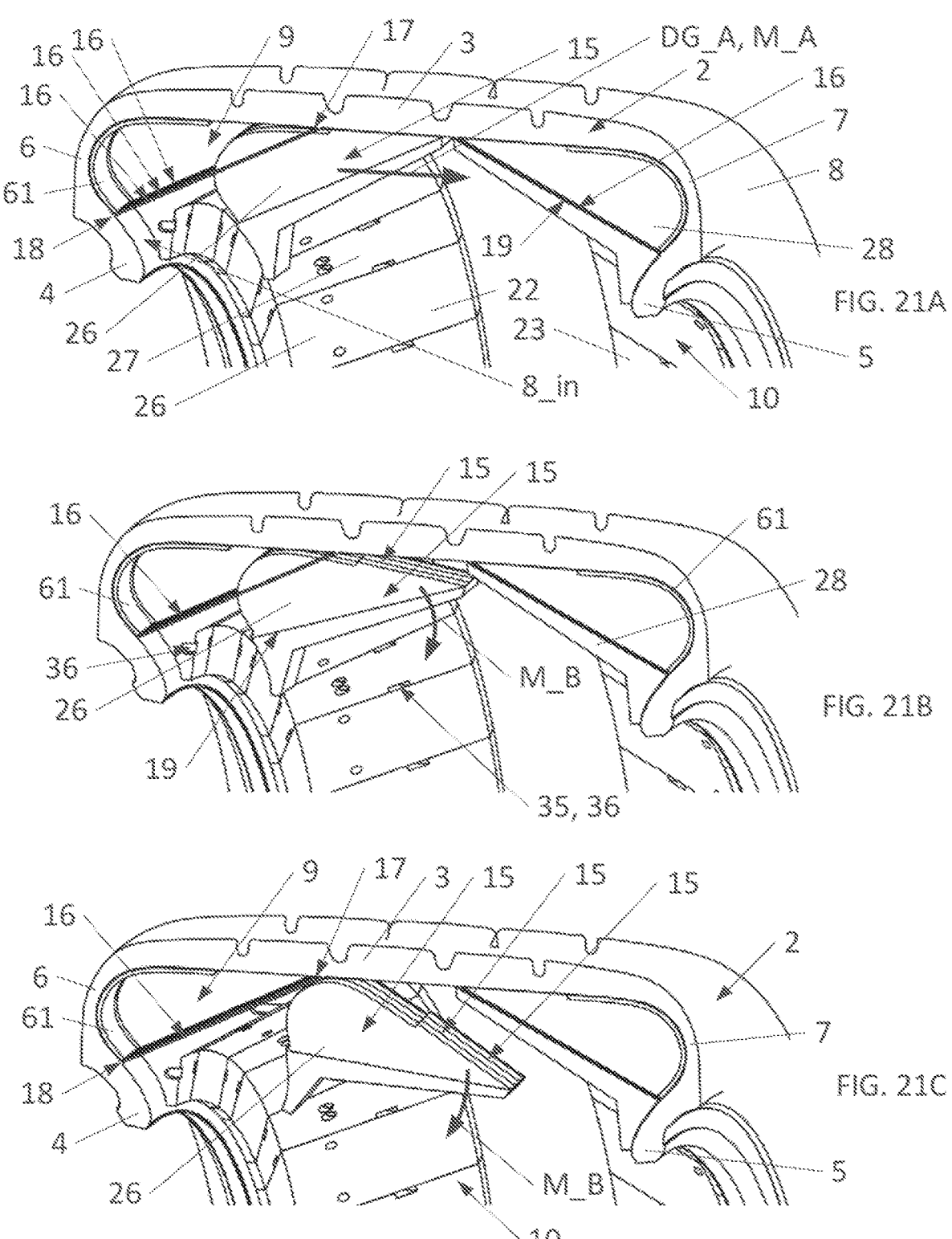
FIGS. 21A, 21B and 21C illustrate, in partial perspective cutaway views in a radial plane, the extraction of a lug key according to the extraction movement illustrated in FIGS. 20A to 20F, and more particularly according to the phases illustrated in FIGS. 20C, 20D and 20E.

The lug keys 26, 28 can interact with the lug arch segments 27, 29 and thus be positioned and retained, by means of pins, engaged in pin holes 35 provided in the keys 26, 28, as can be seen in FIGS. 7A, 9A and 11A, which engage in corresponding recesses 36 provided in the lug arch segments 27, 29, as illustrated in FIGS. 8A and 21B.

Figures 13A, 13B, 13C, 13D, 14A, 14B, 14C, 14D:
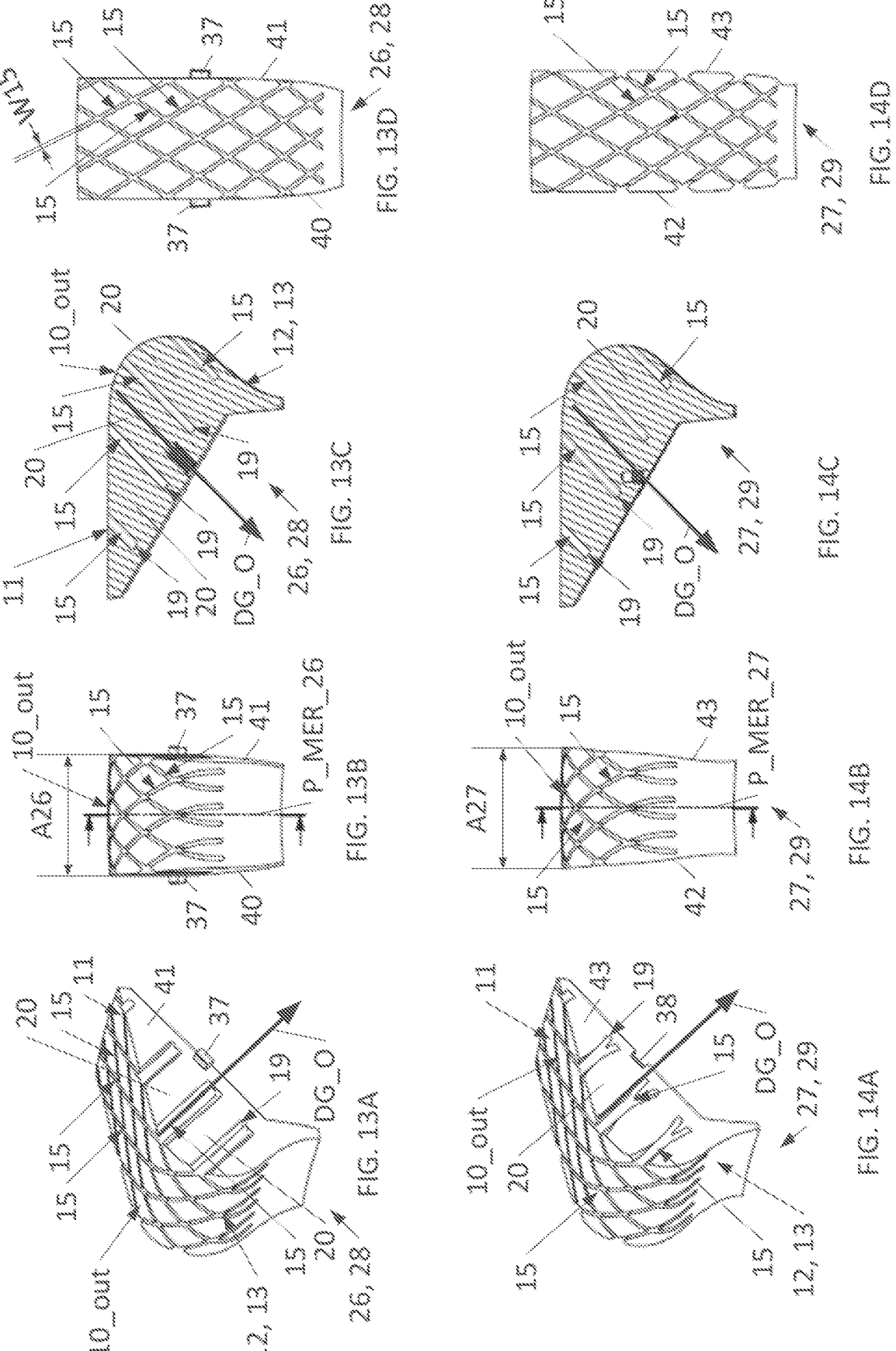
FIGS. 13A, 13B, 13C and 13D illustrate a lug key having criss-crossed grooves suitable for criss-crossed stays, grooves the lateral walls of which this time are generated in an oblique generative direction, the lug key being shown in a perspective view, a front view projected in a plane normal to the central axis of the core, a cross-sectional view in a sagittal meridian plane of the sector in question, and a view projected from the outside of the core in a plane normal to the oblique generative direction respectively.
FIGS. 14A, 14B, 14C and 14D illustrate, in the same views as FIGS. 13A to 13D, a lug arch segment having criss-crossed grooves delimited by walls generated in an oblique generative direction that complements the key in FIGS. 13A to 13D.

As a variant, the lug keys 26, 28 can be provided with protruding tenons 37, as can be seen in FIGS. 13A, 13D, 15A and 15C, suitable for interacting with mortises 38 provided in the lug arch segments 27, 29, as can be seen in FIG. 14A.

Preferably, the lug sectors 26, 27, 28, 29, both the lug keys 26, 28 and the lug arch segments 27, 29, are made from a metal alloy, more preferably from an aluminium alloy, so that they have satisfactory stiffness and satisfactory heat conduction capacity, with relatively low thermal inertia. If criss-crossed grooves 15 are implemented, it might be preferable to make the lug sectors 26, 27, 28, 29 from a more robust metallic material than aluminium, for example maraging steel, in order to improve the strength of the prisms 20.

Preferably, the lug sectors 26, 27, 28, 29 are made by additive manufacturing, which simplifies the manufacturing of relatively complex geometries.

According to one possible embodiment, the flanks 40, 41 of at least one lug key 26, 28, which define the angular sector A26 occupied by the lug key 26, 28 azimuthally about the central axis Z10 and thus form the parting lines PJ along which the lug key 26, 28 interacts with the lug arch segments 27, 29 adjacent to the lug key 26, 28 within the annular sub-assembly 22, 23, that is, within the corresponding lug 22, 23 in the assembled state, are parallel to an imaginary plane referred to as the "sagittal meridian plane" P_MER_26, which corresponds to the radial plane that contains the central axis Z10 and intersects the middle of the angular sector A26 occupied by the lug key 26, 28 in question, as can be seen in FIGS. 7B, 9B, 10 and 11B, so that the flanks 40, 41 allow the extraction of the lug key 26, 28 from the lug arch segments 27, 29 adjacent to it by sliding and/or tilting along the parting lines PJ, as illustrated in FIGS. 20A to 20D, 21A and 21B.

The sagittal meridian plane P_MER_26 sub-divides the arc that marks the outermost radial boundary of the lug key 26, 28 in question, and therefore the arc that corresponds, in projection in a plane normal to the central axis Z10, to the radially outermost boundary of the portion of the receiving surface 10_out belonging to the lug key 26, 28, into two equal semi-arcs, contained by adjacent angular semi-sectors with the same azimuthal angular coverage equal to A26/2.

The flanks 42, 43 of the lug arch segments 27, 29 are preferably formed by planes that are oriented, on either side of the sagittal meridian plane P_MER_27 of the arch segment 27, 29 in question, in directions that are conjugate to the directions of the flanks 40, 41 of the lug keys 26, 28.

Within the lug 22, 23, the lug keys 26, 28 and the lug arch segments 27, 29 are thus abutted flat against each other, which gives the lug keys 26, 28 three potential degrees of freedom relative to the lug arch segments 27, 29, namely two translational degrees of freedom in two secant directions defining the parting lines PJ, typically here the axial direction and the radial direction, and one rotational degree of freedom about an axis normal to the parting lines PJ, therefore here about an axis corresponding to the direction vector of the circumferential direction, the rotational degree of freedom making it possible to tilt the key as illustrated in FIGS. 20D, 20E, 21B and 21C.

It will be noted that such an arrangement of lug keys 26, 28 with flat, parallel flanks 40, 41 can be implemented both with grooves 15 arranged along radial planes (FIGS. 7A, 7B, 7C, 9A, 9B, 9C, 10 and 23), in which case the sagittal meridian plane P_MER_26 of the lug key 26, 28 preferably coincides with the sagittal meridian plane of a groove 15, and with criss-crossed oblique grooves 15 (FIGS. 11A, 11B, 11C), provided that the grooves 15 are a suitable shape.

According to one possible embodiment, the grooves 15 in a single lug sector 26, 27, 28, 29 are each delimited by two lateral walls that are generated in an axial generative direction DG_A that is vectorially collinear, that is, parallel, to the central axis Z10, as is the case in the variants in FIGS. 7A, 8A, 9A and 10, comprising grooves 15 contained in radial planes, and also in the variant in FIGS. 11A and 12A, comprising criss-crossed inclined grooves 15.

Alternatively, according to a possible embodiment similar to the preceding embodiment as it amounts to using generative directions substantially but not exactly parallel to the central axis Z10, the grooves 15 in a single lug sector 26, 27, 28, 29 are each delimited by two lateral walls that form taper faces that flare from the bottom 19 of the groove 15 to the receiving surface 10_out so as to open up, in the whole of the inside of the groove 15 in question, a free space that contains an imaginary volume, referred to as the "necessary clearance volume", generated by virtually moving the stay 16 in question along a virtual exit trajectory, here from the location of the stay 16 close to the bottom 19 of the groove 15 to the receiving surface 10_out, contained in an axial generative direction DG_A that is vectorially collinear, that is, parallel, to the central axis Z10.

Figures 20A, 20B, 20C, 20D, 20E, 20F:
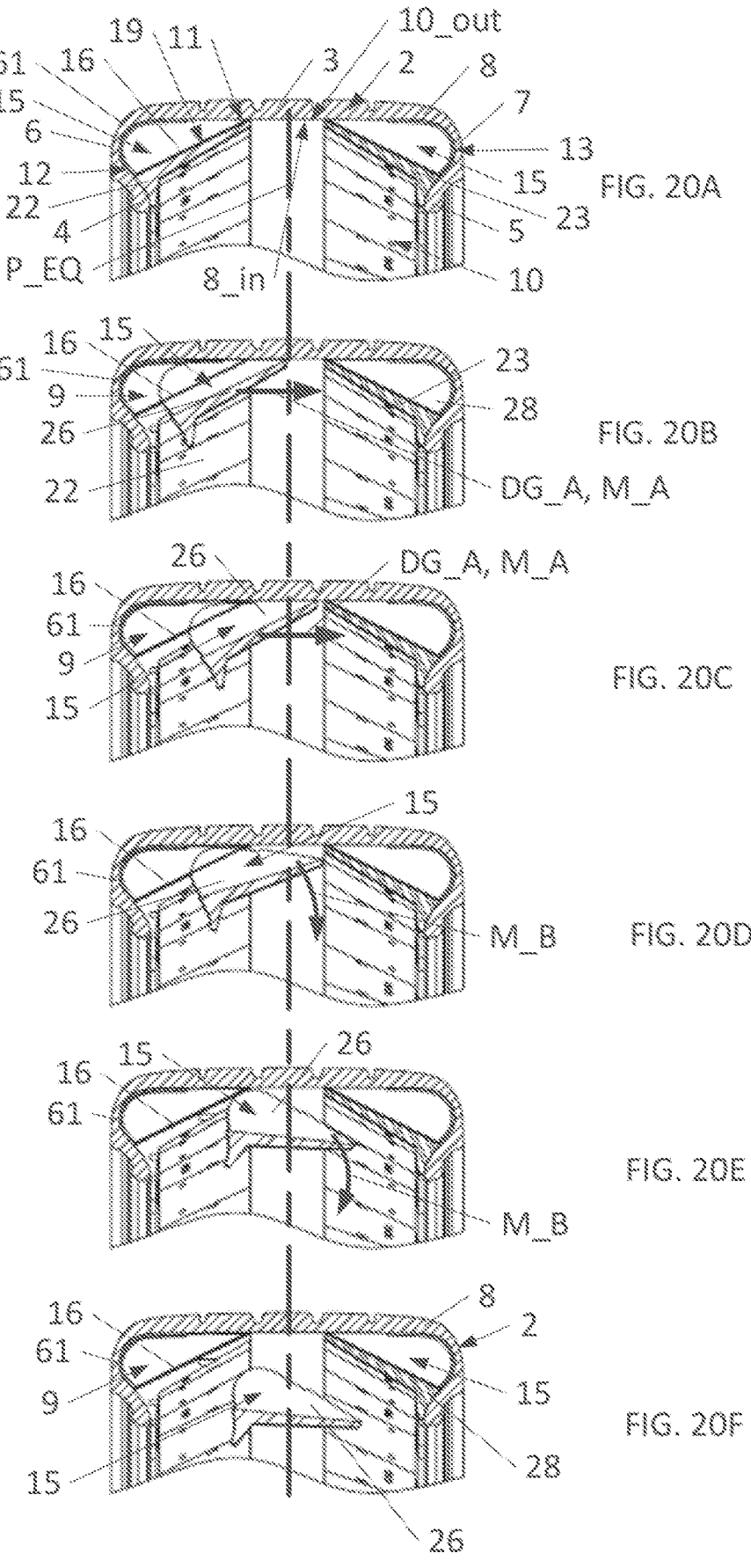
FIGS. 20A, 20B, 20C, 20D, 20E and 20F illustrate, in cross-sectional views in a radial plane, the extraction of a lug key from the tire, through an axial translational extraction movement followed by a tilting, here within a tool with radial grooves and masking shells as shown in FIGS. 6A to 6C, provided with lugs as shown in FIGS. 9A to 9C.

In both cases, namely whether the lateral walls of the grooves 15 are generated in a strictly axial or substantially axial (tapered) generative direction DG_A, such an arrangement of the lateral walls means that the grooves 15 allow the axial extraction of the lug sector 26, 27, 28, 29 in question, in an axial extraction movement M_A that is parallel to the central axis Z10 and directed towards the equatorial plane P_EQ of the core 10, as illustrated in FIGS. 20B, 20C and 21A, without the lateral walls of the grooves 15 interfering with the stays 16 during the axial extraction movement M_A.

If the stays 16 housed in a single lug sector 26, 27, 28, 29 are taken out in a straight line, that is, if the stays 16 are extracted from the grooves 15 in rectilinear translation by performing an extraction movement on the lug sector 26, 27, 28, 29 in question in the axial generative direction DG_A, the stays 16 by definition move through a volume corresponding to the aforementioned necessary clearance volume, the lateral boundaries of which volume define the rectilinear edges, parallel to the axial generative direction DG_A, of an envelope inside which the blocks of material defining the grooves 15 must not penetrate in order not to hinder the extraction. Consequently, if the lateral walls of the grooves 15 were not parallel to this axial generative direction DG_A, or if the lateral walls were not flared relative to this generative direction DG_A in order to form taper faces opening out towards the receiving surface 10_out, then the lateral walls would interfere with the clearance volume, and the lateral walls of the grooves 15 would therefore form obstacles that would collide with the stays 16 during extraction, and would consequently create, through the ramp effect, a transverse thrust that would divert the stays 16 from their desired position, and might damage or even break the stays 16.

Of course, regardless of the arrangement selected for the lateral walls of the grooves, the width W15 of the grooves, which corresponds to the distance that separates the two lateral walls defining the groove 15 in question, has the proportions and/or dimensions mentioned above, and in particular can therefore be between 0.1 mm and 3 mm.

According to one possible embodiment, when the core 10 has lugs 22, 23 angularly sub-divided into sectors 26, 27, 28, 29 and the passages 15 for stays are formed by criss-crossed grooves 15, the criss-crossed grooves 15 in a single lug sector 26, 27, 28, 29 can each be delimited by two lateral walls that are generated in an oblique generative direction DG_O, as is the case in FIGS. 13A to 13D, 14A to 14D, 15A to 15C, 17, 18A, 19 and 22A to 22C, which oblique generative direction DG_O is contained in the radial plane that intersects the middle of the lug sector 26, 27, 28, 29 in question, referred to as the "sagittal meridian plane" P_MER_26, P_MER_27 and which, in the sagittal meridian plane P_MER_26, P_MER_27, converges towards the central axis Z10 in the direction going from the lug 22, 23 in question towards the opposite lug 23, 22, and forms with the central axis Z10 an angle A44, referred to as the "colatitude angle" A44, which is non-zero and strictly less than 90 degrees, preferably between 30 degrees and 50 degrees, for example between 40 and 47 degrees, and for example equal to 45 degrees.

Advantageously, the oblique generative direction DG_O thus "plunges" towards the equatorial plane P_EQ, and towards the opposite lug 23, 22, and therefore allows the extraction of the lug sector 26, 27, 28, 29 in question in an oblique extraction movement M_O, which is directed towards the inside of the core 10 and simultaneously comprises an axial component and a radial component.

Figures 22A, 22B, 22C:
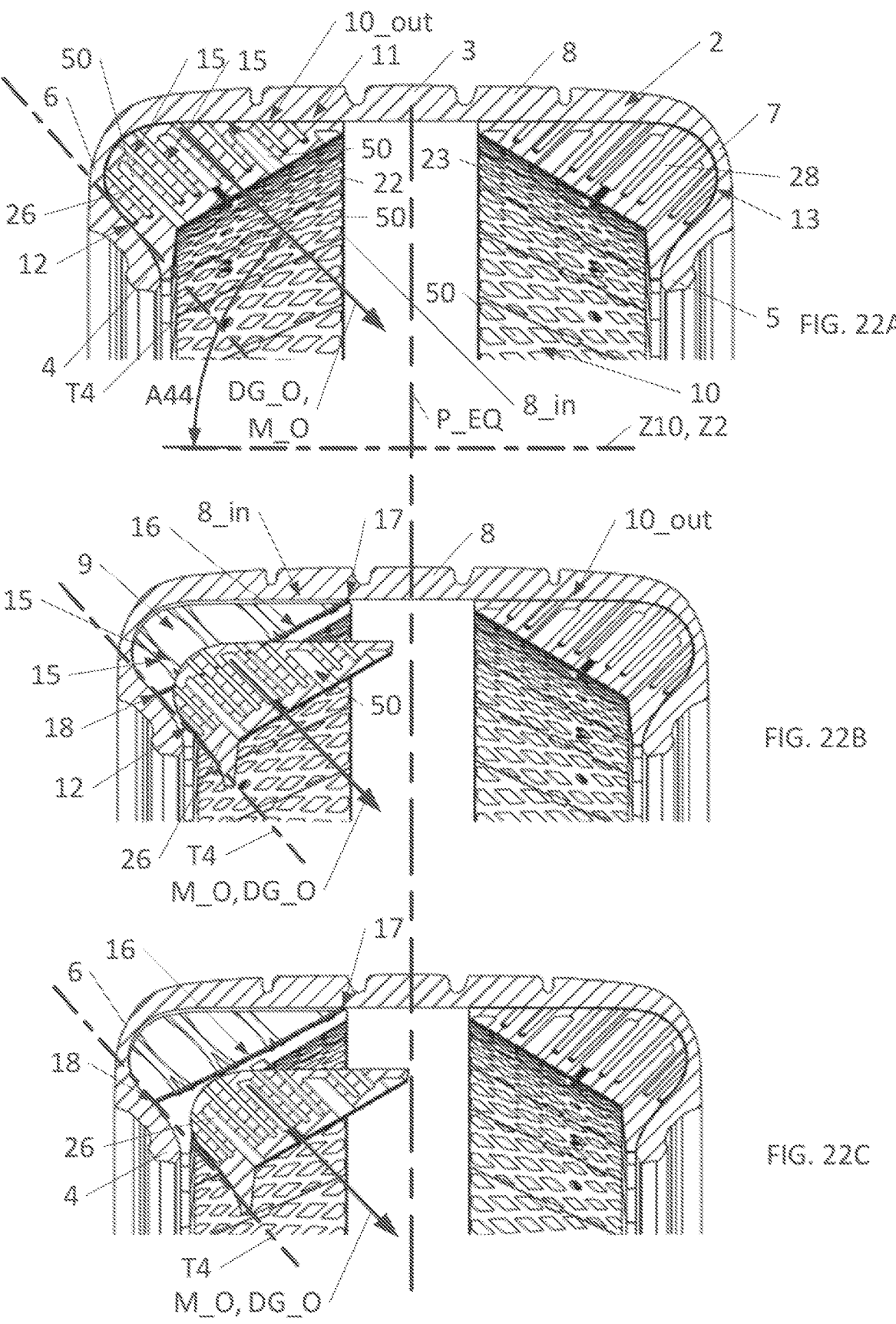
FIGS. 22A, 22B and 22C illustrate, in cross-sectional views in a radial plane, the extraction of a lug key, here of the type illustrated in FIGS. 15A to 15C, according to an oblique extraction movement, borne by the oblique generative direction that is contained in the sagittal meridian plane of the lug key and that was used to generate the lateral walls of the grooves of the lug key.

As such, it will be noted that the absolute value of the colatitude angle A44 will be selected to be equal to or less than the angle that forms, in the sagittal meridian plane P_MER_26, P_MER_27, the tangent T4 to the inner surface 8_in of the wall 8 of the tire 2 at the bead 4, considered at the point where the bead 4 forms the most marked undercut, so that the orientation of the tangent T4 relative to the central axis Z10 defines the "demoldability threshold", that is, the maximum colatitude angle that the oblique extraction movement M_O can have in order to demold the lug sector 26, 27 in question by sliding along the inner surface of the bead 4 without being stopped by the bead 4, and therefore without forcing the pushing back (opening) of the bead 4 and the corresponding sidewall 6 of the tire 2 during the demolding operation, as illustrated in FIGS. 22A, 22B and 22C. Of course, the considerations applicable to the left lug 22 can be adapted mutatis mutandis to the right lug 23.

It will also be noted that, advantageously, generating the lateral walls of the criss-crossed grooves 15 in an oblique generative direction DG_O, closer to the normal at the bottom 19 of the grooves 15 than the axial direction, makes it possible to reduce, relative to an axial generative direction DG_A, the height of the prisms 20 (or pillars) that form the walls of the criss-crossed grooves 15 and extend between the bottom 19 of the grooves and the opening of the grooves 15 on the receiving surface 10_out, as can be seen very clearly when comparing FIGS. 13A and 13C with FIGS. 11A and 11C respectively. The prisms 20, and therefore the lug sectors 26, 27, 28, 29, are thus more rigid and stronger.

When the embodiment according to which the lateral walls of the grooves 15 are generated in an oblique generative direction DG_O is selected, the flanks 40, 41, and therefore the parting lines PJ, which define the lug key 26, 28 in question, can preferably be generated in the oblique generative direction DG_O on the basis of a base profile 45 that corresponds i) either, according to a first option, to the intersection 46 of the receiving surface 10_out and a radial plane P1, P2 that is angularly offset azimuthally relative to the sagittal meridian plane P_MER_26 of the lug key 26, 28 by a value such that the base profile 45 passes through the opposite vertices of the units of the grid (that is, the bases of the aforementioned prisms 20), therefore here through the opposite vertices of the quadrilaterals, which are defined on the receiving surface 10_out by the criss-crossed grooves 15 that follow on from each other from the crown zone 11 to the lateral zone 12, 13 along the base profile 45, as can be seen in FIGS. 13B, 13D, 14B, 14D, 15A, 16B and 17, ii) or, according to a second option, to the zigzag broken line 47 formed, on the receiving surface 10_out, by the alternating sides of the units of the grid (the bases of the aforementioned prisms 20), therefore here by the alternating sides of the quadrilaterals, which are defined on the receiving surface by the criss-crossed grooves 15 and follow on from each other from the crown zone 11 to the lateral zone 12, 13, as illustrated in FIGS. 18A, 18B and 19.

In both cases, such a selection of the base profile 45 advantageously makes it possible to avoid or greatly limit the "aberrations", that is the offsets, at the parting lines PJ, between the grooves 15 belonging to the lug key 26, 28 situated on one side of the parting line PJ and the grooves 15 belonging to the lug arch segment 27, 29 adjacent to the lug key and situated on the other side of the parting line PJ. These aberrations result from the fact that the lateral walls of the grooves 15 are generated in the same oblique generative direction DG_O, therefore parallel to each other, so that the grooves 15 in a single first lug sector 26, 27, 28, 29 do not follow a strictly radial circular distribution, and their ends emerging onto the parting lines PJ, on the receiving surface 10_out, do not always therefore coincide with the ends of the grooves 15 in the adjacent lug sector to which the grooves 15 in the first lug sector must be connected.

Through the judicious selection of the base profile 45, an adequate connection is however ensured, and therefore continuity of the grooves 15, where they cross the parting lines PJ, on the receiving surface 10_out, as the grooves in one lug sector thus substantially continue on from the corresponding grooves in the adjacent lug sector, which guarantees that the stays 16 can easily be inserted into the grooves 15 substantially radially from the outside of the core 10, passing through the receiving surface 10_out.

The solution consisting of selecting a base profile 45 that follows a broken line 47 alternately forming re-entrant angles and salient angles, along the walls defined by the successive prisms 20 (as illustrated in dashed lines in FIGS.

18A, 18B and 19), is generally satisfactory and makes possible robust, precise fitting of the lug keys 26, 28 into the lug arch segments 27, 29, but has the drawback of creating stripes that tend to locally widen certain grooves 15 on the receiving surface 10_out, along the parting lines PJ, as can be seen in FIG. 19.

The first solution might therefore be preferred, according to which the base profile 45 is the curve 46 described on the receiving surface 10_out by the intersection of the radial planes P1, P2 and the receiving surface 10_out and that passes through the vertices of the quadrilaterals, along a diagonal common to the successive quadrilaterals, as illustrated in FIGS. 13A, 13B, 13, 14D, 15A and 17.

Such a solution advantageously makes it possible to make the nodes of the network of quadrilaterals defined by the criss-crossed grooves (that is, the nodes formed by the intersections between two grooves), and more generally the nodes of the network of prisms 20, belonging to the lug key 26 in question, coincide with the nodes of the network of quadrilaterals belonging to the corresponding lug arch segment 27 situated on the other side of the parting line PJ. This guarantees the continuity of the grooves 15 at their connection between successive lug sectors, without significantly affecting the width W15 of the grooves 15.

The geometric principle of generating the base profiles 45 corresponding to the intersection 46 of the receiving surface 10_out and the radial planes P1, P2 is illustrated in FIGS. 16A to 16D.

Figures 15A, 15B, 15C, 16A, 16B, 16C, 16D:
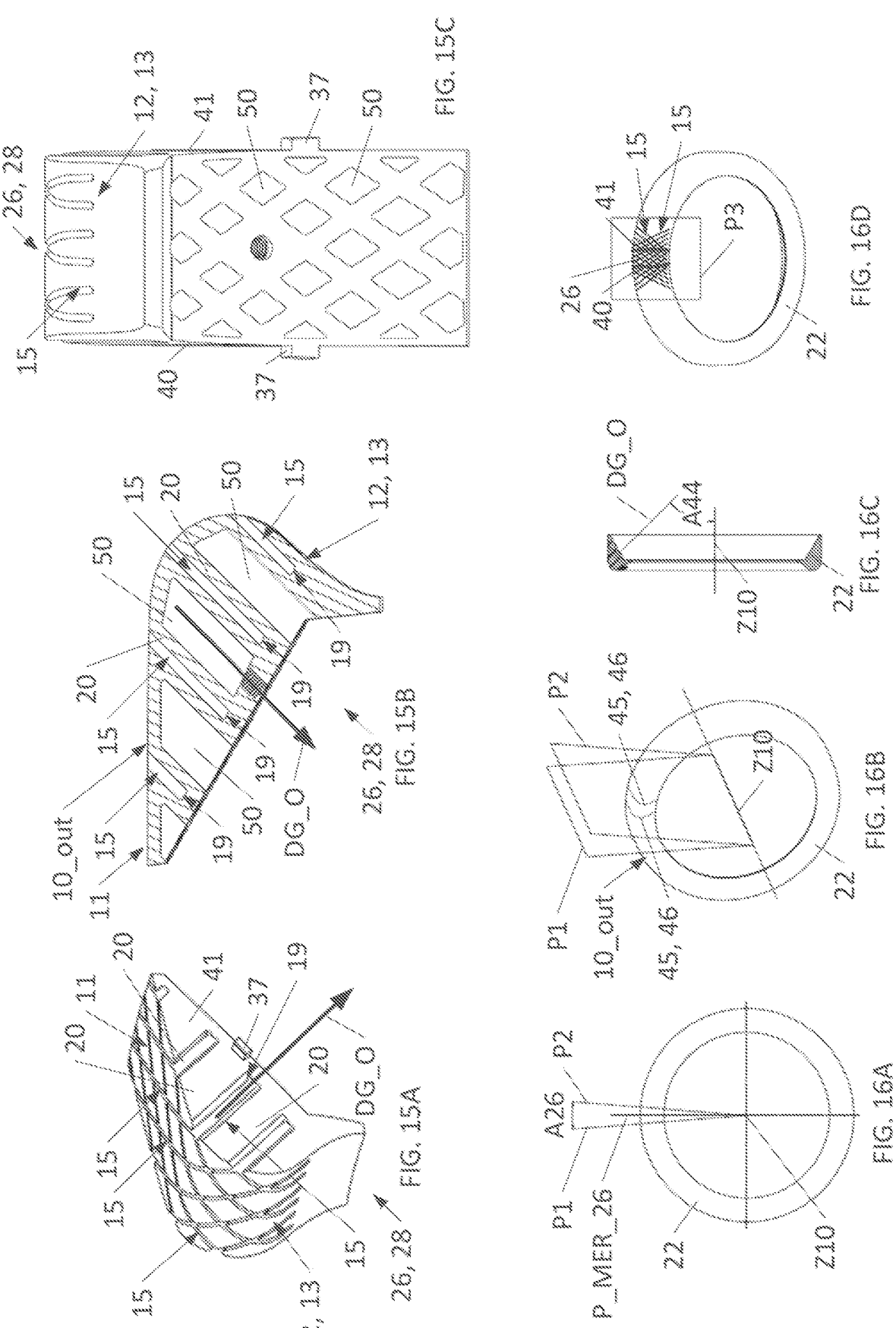
FIGS. 15A, 15B and 15C illustrate, in a perspective view, a cross-sectional view in a sagittal meridian plane and a view projected radially from the inside of the core respectively, a variant of the lug key in FIGS. 13A to 13D within which the inner face of the lug key is provided with recesses that extend between the solid walls that define the grooves, in order to reduce the weight of the lug key and reduce the thermal inertia thereof.
FIGS. 16A, 16B, 16C and 16D illustrate, in schematic views, a geometric principle for generating parting lines applicable to the lug keys that are provided with criss-crossed grooves with walls defined by an oblique generative direction, such as the lug keys in FIGS. 13A to 13D and 15A to 15C.

As illustrated in FIG. 16A, the sagittal meridian plane P_MER_26 of the lug sector, in this example a lug key 26, the flanks 40, 41 of which are to be defined, is first of all identified. To this end, two virtual radial planes P1, P2 are defined, situated on either side of the sagittal meridian plane P_MER_26, each the same angular distance from the sagittal meridian plane P_MER_26, equal to half of the value of the desired angular coverage A26 of the lug sector 26.

Advantageously, as the value of the angular coverage A26 is a (whole) multiple of the repeating pitch P16 of the grooves 15, it is possible to place each radial plane P1, P2 in line with the nodes formed by the vertices of the quadrilaterals described by the criss-crossed grooves 15.

Next, as illustrated in FIGS. 16B, the base profiles 45 that correspond to the curves 46 forming the intersections of the toroidal receiving surface 10_out and the radial planes P1, P2 are considered.

Starting from these curves 46, the flanks 40, 41 of the lug sector 26 are then generated, by translating the curves 46 in a rectilinear oblique generative direction DG_O, contained in the sagittal meridian plane P_MER_26 and oriented along a colatitude angle A44 selected so that it plunges towards central axis Z10, which the oblique generative direction DG_O intersects (FIG. 16C).

In practice, in an equivalent manner, this amounts to cutting the flanks 40, 41 of the lug sector 26 on the basis of a projection of the base profile 45, 46 in a plane P3 normal to the oblique generative direction DG_O selected, as illustrated in FIG. 16D.

In addition, regardless of the variant embodiment envisaged for the lug sectors 26, 27, 28, 29 and in particular when the lug sectors comprise criss-crossed inclined grooves 15 generated in an oblique generative direction DG_O, as the passages 15 for the stays 16, here the grooves 15, are delimited by lateral walls, the core 10 can preferably have, on the back of the lateral walls, below the receiving surface 10_out, and penetrating between the passages 15, recesses 50 that are distinct from the passages 15 and separated from the passages 15 by the lateral walls, as illustrated in FIGS. 15B and 15C.

The recesses 50 made in the lug sectors 26, 27, 28, 29 open towards the inside of the core 10, here more particularly onto the bearing faces of the lug sectors that rest against the taper faces 32, 33 of the ring.

The recesses preferably come up to a depth, below the receiving surface 10_out, that is less than the hollow depth of the passages 15 bordering the recesses, that is, less than the depth of the bottom 19 of the grooves 15, so that the core 10 has a thinner skin in line with the recesses 50 than in line with the lateral walls of the passages 15.

Such recesses 50 make it possible to give the lugs 22, 23 a structure that is light and, above all, has low thermal inertia, which therefore optimizes the transfer of heat from the central ring 21, which preferably contains heating elements such as electric heating resistors.

According to a preferred feature that can form an disclosure in its own right, in particular in combination with the sectoral angular division of the lugs 22, 23 and/or of the central ring 21, it is thus possible to produce a core 10 within which only the central ring 21, and more particularly the sectors 24, 25 of the central ring 21, contain heating elements, such as electric heating resistors, while the lugs 22, 23 are not provided with heating elements, and nonetheless ensure a rapid, uniform temperature increase of the receiving surface 10_out during the operation for curing the tire 2.

In addition, according to a preferred feature that can form an disclosure in its own right, and which can apply to any variant described above, in particular when the passages 15 for stays 16 are formed by grooves 15, the tool 1 can comprise a barrier device 60 that interacts with the core 10 to obstruct the penetration of the components forming the crown 3, the sidewalls 6, 7 or the beads 4, 5 of the tire 2 into the passages 15 of the core 10 in which the stays 16 are engaged.

More particularly, the barrier device 60 prevents the materials, and in particular the rubber-based compositions, present in the components of the tire 2, from penetrating into the grooves 15 by creep, in order to prevent the formation of rubber burrs that would adhere the stays 16 to the walls of the grooves 15 and would therefore create the risk of the stays 16 being pulled out when the corresponding lug sectors 26, 27, 28, 29 were extracted.

The barrier device 60 can comprise masking elements 61, 62 suitable for forming a screen, on the receiving surface 10_out, between the components of the wall 8 of the tire and the openings of the passages 15 for stays, here the openings of the grooves 15. The masking elements 61 are of course selected so that they are compatible with the high temperature values (typically greater than 100° C.) and pressure values (typically greater than 60 bar) to which the core 10 and the tire 2 are exposed during the curing operation.

Flexible tape, such as metal tape, made from steel for example, retained by an adhesive, for example adhesive tape, can be used for the masking elements, which flexible tape is applied to the receiving surface 10_out after the stays 16 have been placed in the grooves 15, in order to cover the grooves 15.

According to a preferred possible embodiment, the masking elements comprise reusable shells 61, for example made from a polymer or preferably made from metal.

The shells 61 are preferably a curved C-shape so that each of the shells 61 can, preferably in one piece, continuously cover the openings of the grooves 15 from the lateral zone 12, 13 to the crown zone 11, following the curve of the core 10, here the curve of the lugs 22, 23, as can be seen in FIGS. 6A, 6B, 6C, 20A and 21A.

According to a preferred embodiment, as can be seen in FIGS. 6C, 9A, 9B and 9C, the lug sectors 26, 27, 28, 29 can comprise an indentation 62 in which the corresponding shell 61 can fit and is advantageously positioned and retained by one or more shoulders. The depth of the indentation 62 is preferably such that the radially outer surface of the shell 61 is flush with the adjacent receiving surface 10_out.

Figures 6A, 6B, 6C:
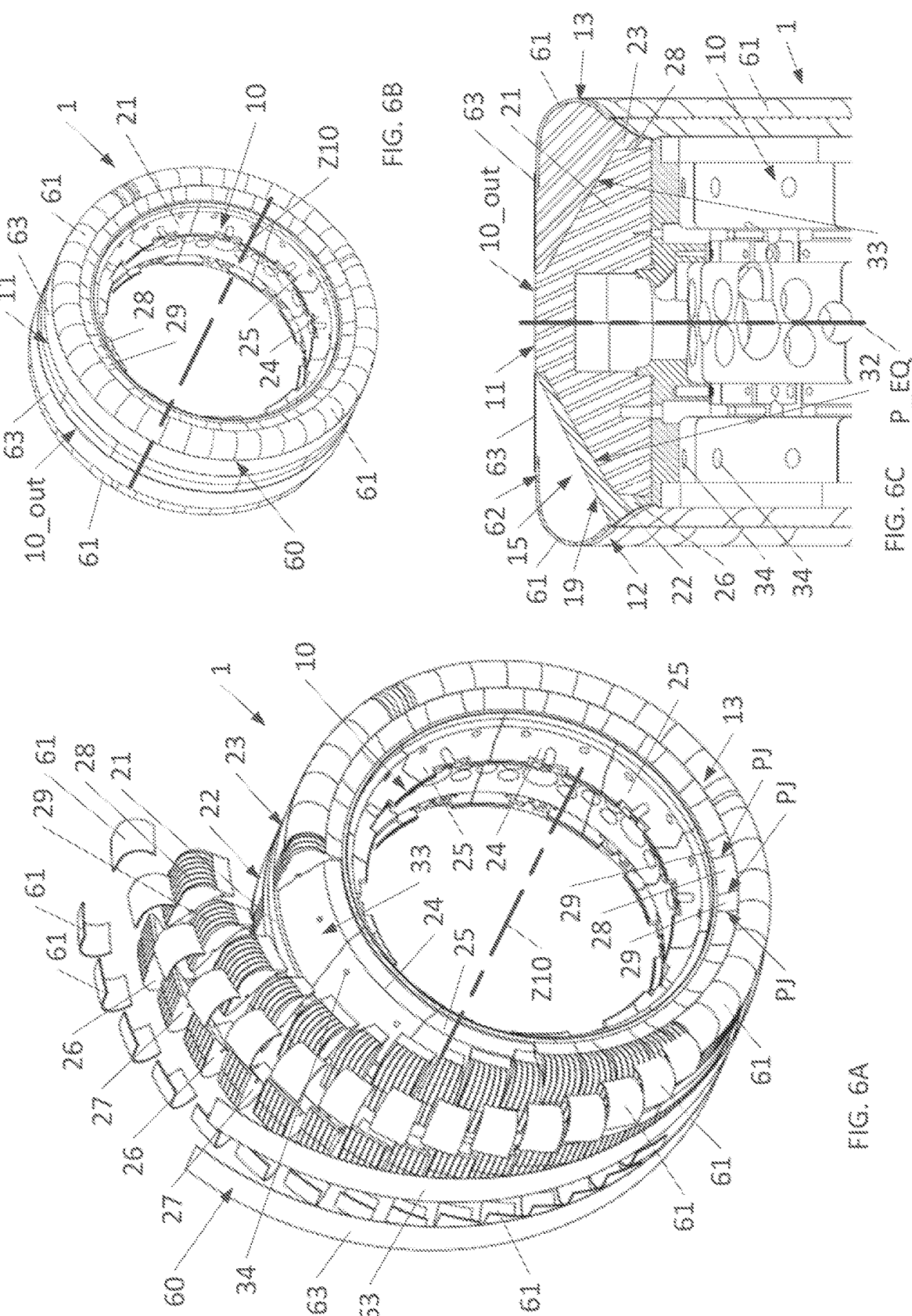
FIGS. 6A, 6B and 6C illustrate, in a partially exploded perspective view, an assembled perspective view and a detailed cross-sectional view in a radial plane respectively, a variant of the tool with radial grooves in FIGS. 4A to 4C provided with a barrier device suitable for obstructing the penetration of the rubber-based components of the tire into the grooves, which barrier device comprises to this end a first set of masking elements formed by sectoral shells that each cover a lug sector, following the curve of the shoulder forming the transition between the lateral zone and the crown zone of the lug, in order to mask the corresponding grooves, and also a second set of masking elements, comprising annular bands that are placed at the transition between each lug and the central ring in order to cover the grooves in the crown zone. It will be noted that, for ease of depiction, the left- and right-hand halves in FIG. 6C correspond to cross-sections along two separate radial planes, slightly offset from each other azimuthally about the central axis of the core, so that the half situated here on the left of the equatorial plane is cut through the hollow part of a groove, while the half situated on the right of the equatorial plane is cut through the solid lateral wall that defines the groove.

Preferably, for ease of dismantling, a separate shell 61 is provided for each lug sector 26, 27, 28, 29, and each shell 61 covers an angular sector A26, A27 identical to that of the lug key 26, 28 or the lug arch segment 27, 29 respectively that the shell 61 is covering, as can be seen clearly in FIG. 6A.

Preferably, all of the shells 61 are identical to each other and therefore interchangeable with each other, at least within a single lug 22, and preferably between the two lugs 22, 23.

The masking elements can also comprise, preferably in addition to the shells 61, masking strips 63 formed by tapes, preferably made from metal, that can help to mask the openings of the grooves in the crown zone 11 of the receiving surface 10_out, preferably by partially overlapping the shells 61, as illustrated in particular in FIGS. 6A, 6B and 6C. The overlap can extend axially over several millimeters, for example 3 mm to 15 mm.

Splitting the masking screen into shells 61 and masking strips 63 helps to facilitate demolding, and more particularly the extraction of the shells 61 and the strips 63 from the inside of the tire, between the stays 16. The overlap between shell 61 and strip 63 also advantageously makes it possible to avoid creating a leakage gap between these two masking elements.

Preferably, the tool 1 comprises two sets of shells 61, one on each side of the equatorial plane P_EQ, and two strips 63 that each make a complete turn around the central axis Z10 and are each situated on one side of the equatorial plane P_EQ, as can be seen in FIGS. 6A, 6B and 6C.

The strips 63 each stop axially short of the equatorial plane P_EQ, so that the portion of the crown zone 11 formed by the central ring 21, where the crown anchor point 17 is formed, is left uncovered.

As a variant, in addition or preferably as an alternative to masking elements 61, 63, the barrier device 60 can comprise filling elements 65 designed to fill and thus substantially close off the interstitial space that remains empty within the passages 15 after the stays 16 have been placed in the passages 15.

More particularly, the filling elements 65 can occupy the free space between the lateral walls of the grooves 15, the stay 16 contained in the groove in question, and the opening of the groove on the receiving surface 10_out.

Any suitable substance, capable of entering the passages 15 and sufficiently dense to prevent, or substantially slow, the penetration into the groove 15 of the materials forming the components of the tire, and in particular the non-vulcanized rubber-based mixtures, can be used as a filling element 65.

Figures 23, 24, 25:
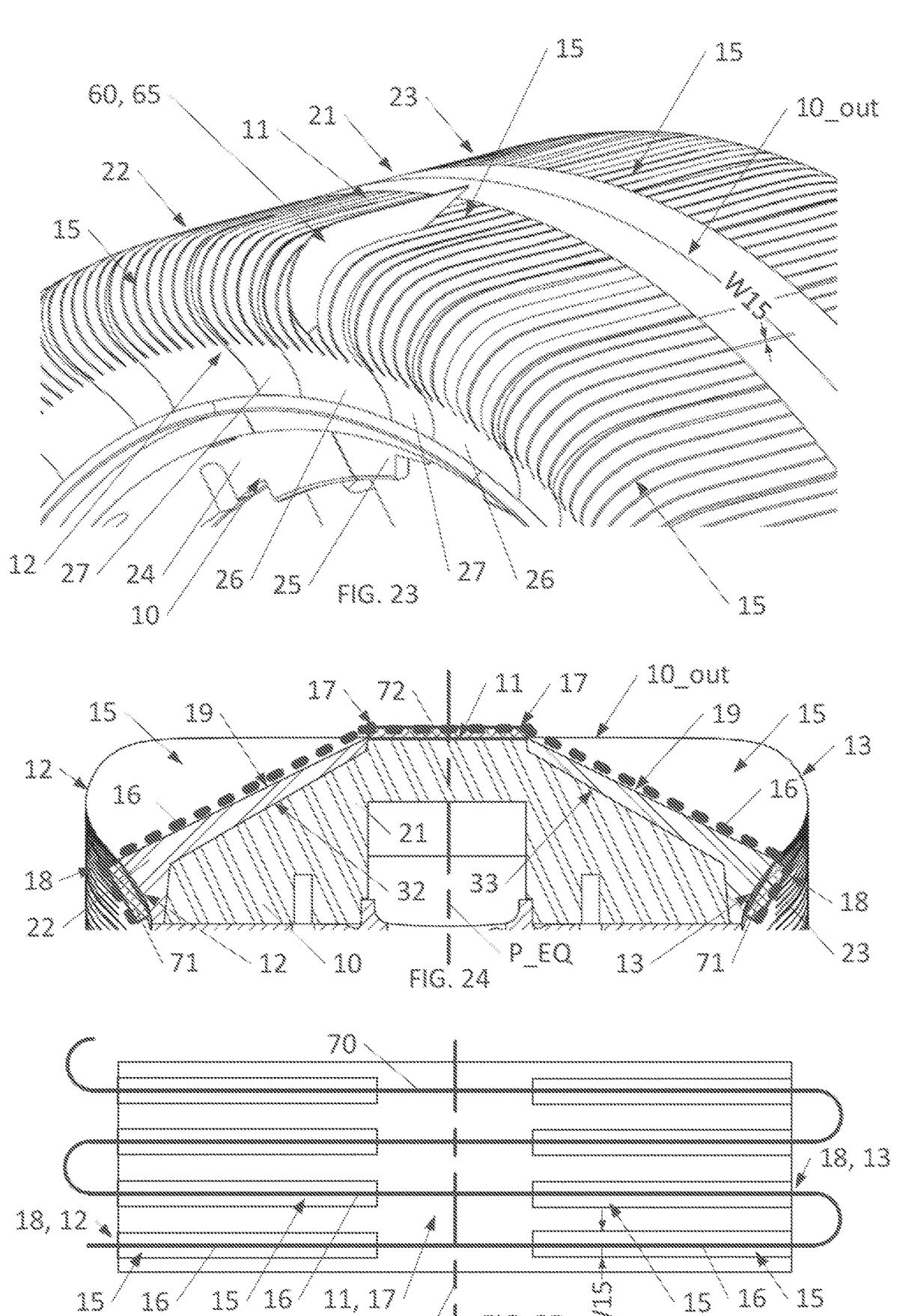
FIG. 23 illustrates, in a partial perspective view, a variant embodiment according to which the barrier device uses a set of shims that are inserted into the grooves, after the stays have been placed in the grooves, in order to close off the grooves, here flush with the receiving surface.
FIG. 24 illustrates, in a detailed cross-sectional view in a meridian plane passing through the middle of the grooves of the lugs of a core according to FIGS. 4A to 4C, the placing of the stays within the core, before the wall of the tire is produced.
FIG. 25 illustrates, in a schematic view, the principle of production of the stays using a single continuous thread engaged in the successive passages forming a snake, and the loops of which forming the alternating extrema of the snake are suitable for forming the lateral anchor points of the stays.

According to one exemplary embodiment, illustrated in FIG. 23, the filling elements can be formed by rigid shims 65, preferably made from metal, of a shape substantially conjugate to the cavities of the grooves 15, which are inserted into the grooves 15 after the stays 16 have first been engaged in the grooves.

Of course, the disclosure also relates to a method for manufacturing a stayed tire 2 on a core 10.

In practice, such a method preferably amounts to using a tool 1 as described above.

The disclosure thus also relates to a method for manufacturing a toroidal tire 2 comprising a crown 3 suitable for forming a tread, a first annular bead 4 and a second annular bead 5 designed to make it possible to attach the tire to a mounting support such as a rim, together with a first sidewall 6 and a second sidewall 7 that connect the crown 3 to the first bead 4 and to the second bead 5 respectively, the crown 3, the first and second sidewalls 6, 7 and the first and second beads 4, 5 as a whole forming a wall 8 having a concave inner surface 8_in that defines a cavity 9 of the tire 2, the tire 2 comprising reinforcing elements 16, referred to as "stays" 16 that each extend in the cavity 9 of the tire, connecting a crown anchor point 17 situated in the crown 3 of the tire to a lateral anchor point 18 situated in one of the sidewalls 6, 7, or beads 4, 5 of the tire.

The method comprises a preparation step (S0) during which the tool 1 according to the disclosure is prepared.

More particularly, during the preparation step (S0), the ring keys 24 and ring arch segments 25 are assembled to form the central ring 21, as illustrated in FIGS. 3A and 3B, and then a series of lug keys 26, 28 and lug arch segments 27, 29 are fastened to each of the taper faces 32, 33 of the central ring 21 in order to form the lugs 22, 23, as illustrated in particular in FIGS. 4A to 4C and 5A to 5C.

Next, the method comprises a step (S2) of placing stays 16, during which at least one reinforcing thread 70, suitable for forming a stay 16, is passed through each passage 15 of the core 10.

Preferably, a single continuous single-strand or multi-strand reinforcing thread 70 is used to form a plurality of stays 16, preferably more than 25%, more than 50%, or even all of the stays 16 in the tire 2.

To this end, the continuous reinforcing thread 70 is arranged in a snake through the successive passages 15, here by inserting the reinforcing thread 70 into the grooves 15, below the receiving surface 10_out, and bringing the reinforcing thread 70 back out above the receiving surface 10_out in the crown zone 11 and in the lateral zones 12, 13 at the desired anchor points 17, 18, as can be seen in FIG. 24, and thus taking the continuous reinforcing thread 70 back and forth in one piece from one lateral zone 12 of the core 10 to the other lateral zone 13, passing through the crown zone 11, as can be seen in FIG. 25, so as to form undulations, here with a substantially symmetrical amplitude relative to the equatorial plane P_EQ.

Next, the method comprises a packing step (S4) during which the components forming the crown 3, the sidewalls 6, 7 and the beads 4, 5 of the tire are deposited on the receiving surface 10_out, in order to build the wall 8 of the tire 2.

The components preferably comprise rubber-based strips or plies, optionally reinforced with textile, polymer or metal longitudinal reinforcing fibers. Other reinforcing components can be provided, such as composite fiberglass and resin strips.

All or some of the components can preferably be laid by winding onto the rotating core 10.

Next, the method comprises a curing step (S5).

During this step, the core 10 and the tire 2 held by the core 10 are placed in a curing mold, in order to vulcanize the rubber-based components of the tire 2. To this end, the temperature of the mold, and more particularly of the tire, is preferably taken to a value of between 120° C. and 200° C.

Next, the method comprises a demolding step (S6) during which the core 10 is disengaged from the tire 2, leaving the stays 16 in place in the cavity 9 of the tire 2, as illustrated in particular in the sequences in FIGS. 20A to 20F, 21A to 21C and 22A to 22C.

If part of the core 10, for example the lugs 22, 23, is single-use, it can be destroyed by the appropriate method (melting, dissolving, crumbling, impact, sublimation, etc.) to release the cavity 9 and the stays 16.

If, as is preferably the case, the core 10 is reusable, and therefore made up of a modular assembly of parts that can be dismantled, the parts are gradually dismantled and extracted in order to release the tire 2.

Preferably, following the preparation step (S0), and before the step (S2) of placing the stays 16, the method comprises a pre-packing step (S1) during which, as illustrated in FIG. 24, anchor structures 71, 72 that are designed to receive the ends of the stays 16 that emerge from the passages 15 of the core 10 and to adhere to the components forming the sidewalls 6, 7 or the beads 4, 5 or to the components forming the crown 3 respectively, by sandwiching the ends of the stays 16 between the anchor structures 71, 72 and the components, in order to fasten the stays 16 to the anchor points 18, 17 provided, are laid on the lateral zones 12, 13 and on the crown zone 11 of the receiving surface 10_out of the core 10, facing the anchor points 18, 17 provided for attaching the stays 16 to the wall 8 of the tire.

Preferably, the anchor structures 71, 72 are formed from a non-vulcanized rubber-based material, optionally reinforced by means of reinforcing threads or fibers. The anchor structures 71, 72 can for example take the form of reinforcing strips or turns wound on the core 10.

Once the anchor structures 71, 72 are positioned ready on the receiving surface 10_out, outside the grooved portions, at the desired anchor points 18, 17, the stays 16 are placed in the passages so that the portions of the stays 16 that emerge from the passages 15 are positioned on top of the anchor structures 71, 72, so that when the components of the wall 8 of the tire are then laid, the components adhere to the anchor structures already in place on the core 10 and the anchor structures 71, 72 are therefore incorporated into the wall 8 of the tire 2, thus trapping the ends of the stays 16 inside the wall 8 at the anchor points 18, 17 provided.

Preferably, it is the loops forming the extrema of the undulations of the snake of continuous reinforcing thread 70, and which therefore correspond to the transition zones between two successive stays belonging to a single hemisphere, that form the portions of the stays 16 that will be trapped by the lateral anchor structures 71 placed on the lateral zones 12, 13, to form the lateral anchor points 18 of the stays, while the intermediate portions of the continuous reinforcing thread 70 that connect two successive stays 16 belonging to two different hemispheres, emerging from the groove 15 of the first stay in order to travel across the crown zone 11 of the receiving surface 10_out and pass through the equatorial plane P_EQ, then go back into the groove 15 of the second stay 16, will be trapped by the crown anchor structure 72.

Preferably, after the step (S2) of placing stays 16, the method comprises a protection step (S3), during which a barrier device 60 is implemented which, during the packing step (S4) and during the curing step (S5), interacts with the core 10 to obstruct the penetration of the components forming the crown 3, the sidewalls 6, 7 or the beads 4, 5 of the tire 2 into the passages 15 of the core 10, here into the grooves 15 in which the stays 16 are engaged.

For example, after the step (S2) of placing the stays and before the packing step (S4), masking elements, such as shells 61 and/or masking strips 63, as described above, that cover the passages 15 and thus form a screen between the passages 15 and the components of the wall 8 of the tire, can be applied to the receiving surface 10_out, as illustrated in FIGS. 6A and 6B, or a filling element 65 can be used, such as a shim 65 (FIG. 23), that temporarily fills, at least during the curing step (S5), or even also during the packing step (S4), the volume of each passage 15 that is left free between the stay 16 engaged in the passage 15 and the opening(s) of the passage 15 that emerge(s) on the receiving surface 10_out.

Preferably, as the core 10 comprises a central ring 21, and a left lug 22 and a right lug 23 containing the passages 15 for stays 16 in the form of grooves 15 that are open on the receiving surface 10_out, each of the central ring 21 and lugs 22, 23 being angularly split into sectors forming keys 24, 26, 28 alternating with arch segments 25, 27, 29, as described above, the demolding step (S6) firstly comprises a sub-step of removing the central ring 21, during which the keys 24 of the central ring, then the arch segments 25 of the central ring, are radially removed, in order to release the lugs 22, 23, leaving a configuration in which the sectors 26, 27, 28, 29 of the lugs 22, 23 are accessible from the inside of the tire 2 as illustrated in FIGS. 20A and 22A, then a second sub-step of extracting a first lug 22 during which the keys 26 of one 22 of the left and right lugs are extracted from the cavity 9 of the tire 2, then the arch segments 27 of the lug 22 are extracted from the cavity 9 of the tire, in order to release the corresponding portion of the cavity 9 and the stays 16 that are located in the corresponding portion of the cavity 9, here the stays 16 that occupy the first hemisphere of the tire 2, and a third sub-step of extracting the other lug 23 during which the keys 28 of the other lug 23 are extracted from the cavity 9 of the tire, then the arch segments 29 of the other lug 23 are extracted from the cavity 9 of the tire, in order to release the corresponding portion of the cavity 9 and the stays 16 that are located in the corresponding portion of the cavity 9, here the stays that are located in the second hemisphere of the tire 2.

It will be noted that the order of extraction of the sectors of the lugs 22, 23 can optionally be adjusted slightly, the only requirement being, within a given lug, to extract the two lug keys 26, 28 on either side of a lug arch segment 27, 29 first before the lug arch segment 27, 29 can be extracted in turn. For example, provision can thus be made to extract the keys 26 of the first lug 22 first, then the arch segments 27 of the first lug 22, before starting to extract the keys 28 of the second lug 23 and continuing with the extraction of the arch segments 29 of the second lug, or to extract the keys 26 of the first lug 22 first, then the keys 28 of the second lug 23, then the arch segments 27 of the first lug 22 and finally the arch segments 29 of the second lug 23, or even, within a single lug, gradually extract azimuthally about the central axis Z10, step by step, a first lug key 26, then the lug key situated on the other side of the corresponding lug arch segment 27, then the lug arch segment 27 thus released, then the immediately adjacent lug key 26, then the second lug arch segment 27 thus released, etc.

The sectors 26, 27, 28, 29 of each lug 22, 23 are extracted in an extraction movement that depends on the arrangement of the lateral walls of the grooves, namely: i) in an axial translational extraction movement M_A, if the lateral walls of the grooves 15 are generated in an axial generative direction DG_A parallel to the central axis Z10, as illustrated in FIGS. 20B, 20C and 21A: preferably the axial translational extraction movement M_A can be followed by a tilting movement M_B about an axis normal to the sagittal meridian plane P_MER_26, P_MER_27 of the sector 26, 27, 28, 29 in question, as illustrated in FIGS. 20D, 20E, 21B and 21C, in particular if the distance axially separating the lugs 22, 23 is, due to the dimensions of the tire 2 manufactured, less than the overall axial length of the sector 26, 27, 28, 29 being extracted: this tilting M_B is facilitated by the fact that the radially inner lower face of the lug 23 opposite the lug 22 being dismantled forms a ramp conjugate to the ramp of the corresponding taper face 32 of the central ring 21, and therefore offers corresponding clearance once the central ring 21 has been removed: ii) or in an oblique centripetal translational movement M_O, simultaneously comprising an axial component and a radial component, as illustrated in FIGS. 22A, 22B and 22C, if the lateral walls of the grooves 15 are generated in an oblique generative direction DG_O that intersects the central axis Z10 at a non-zero acute colatitude angle A44. The oblique translational movement M_O is advantageously contained in the oblique generative direction DG_O.

It will be noted that, in the first case i) above, the axial translational extraction movement M_A is in particular necessary to make it possible to disengage the lobe of the lug 22, 23 sufficiently from the hollow of the cavity 9, and in particular from the inner lip of the bead 4, 5 so that it is then possible to perform the tilting movement M_B without forcing the bead 4, 5 to move away from the crown 3, and therefore without forcing the stays 16.

It will also be noted that the inventors have observed that, doubtless due to the residual temperature of the core 10, and above all of the tire 2, when it is extracted from the core 10 after curing, which residual temperature can be between 50° C. and 70° C., the stays 16 are still relatively slack, that is, are not (yet) completely taut, which facilitates extraction without damaging the stays 16.

Regardless of the trajectory initially taken for the extraction movement M_A, M_O, once the lug sector 26, 27, 28, 29 has been disengaged from the stay 16, the sequence for extracting the lug sector 26, 27, 28, 29 can be completed freely from inside the tire 2, for example by following, as illustrated in FIG. 20F, a radial movement that brings the sector 26, 27, 28, 29 in question towards the central axis Z10, to radially cross the threshold formed by the bead 4, 5, followed by an axial movement that completely takes the sector 26, 27, 28, 29 out of the envelope axially defined by the tire 2.

Once the sectors 26, 27 of one lug 22 have been extracted, or after each of the lugs 22, 23 has been disengaged from the cavity 9 of the tire 2, the corresponding shells 61 can be extracted in turn, individually, by rotation and tilting in order to slide the shells 61 by the edge between two stays 16 (one arm of the shell after the other). Likewise, the masking strips 63 can be extracted by spiral sliding that passes them into the space between two successive stays 16.

Of course, the disclosure is in no way limited only to the variant embodiments described above, and a person skilled in the art could in particular isolate or freely combine the abovementioned features, or replace them with equivalents.

What is claimed is:

1. A tool suitable for manufacturing a toroidal tire comprising a crown suitable for forming a tread, a first annular bead and a second annular bead designed to make it possible to attach the tire to a mounting support such as a rim, together with a first sidewall and a second sidewall that connect the crown to the first bead and to the second bead respectively, the crown, the first and second sidewalls, and the first and second beads as a whole forming a wall having a concave inner surface that defines a cavity of the tire, said tool comprising a toroidal core having, about its central axis, a convex outer receiving surface, which has a shape conjugate to the inner surface of the wall of the tire and which comprises to this end a radially outer crown zone suitable for receiving components forming the crown of the tire and, axially on either side of said crown zone, a first lateral zone turned in towards the central axis and suitable for receiving components forming the first sidewall and the first bead, together with a second lateral zone turned in towards the central axis and suitable for receiving components forming the second sidewall and the second bead, so that the core embodies a reserved volume, which is externally delimited by the receiving surface and corresponds to the cavity of the tire, the core has a plurality of passages that extend inside the reserved volume, below the receiving surface, and which open onto said receiving surface so that each of said passages connects the crown zone of the receiving surface to one of the first and second lateral zones so that the core can receive, inside said passages, stays, which are designed to be permanently incorporated into the structure of the tire and each extend in the cavity of the tire, connecting a crown anchor point situated in the crown of the tire to a lateral anchor point situated in one of the sidewalls or beads of the tire; and a barrier device that interacts with the core to obstruct a penetration of the components forming the crown, the sidewalls, or the beads of the tire into the passages of the core in which the stays are engaged.

2. The tool according to claim 1, wherein the passages for stays are formed by grooves that are hollowed out from the receiving surface in a thickness of the reserved volume so that they have a continuous opening along a profile of the receiving surface, from the crown zone to the lateral zone in question.

3. The tool according to claim 2, wherein the core comprises an assembly of a plurality of annular sub-assemblies comprising:

i) a central ring, which forms a central portion of the crown zone of the receiving surface suitable for receiving one or more components forming the crown of the tire, said central ring being without passages for stays;

ii) a left lug, which is axially adjacent to the central ring, said left lug comprising the first lateral zone of the receiving surface as well as a portion of the crown zone that axially extends the central portion of the crown zone on the corresponding side of the central ring, and said left lug containing the grooves forming the passages for the stays that connect the first sidewall of the tire to the crown of the tire; and iii) a right lug, which is axially adjacent to the central ring, on the side of the central ring that is axially opposite the side receiving the left lug, said right lug comprising the second lateral zone of the receiving surface as well as a portion of the crown zone that axially extends the central portion of the crown zone on the corresponding side of the central ring, and said right lug containing the grooves forming the passages for the stays that connect the second sidewall of the tire to the crown of the tire;

wherein the central ring, the left lug, and the right lug are each angularly split into sectors azimuthally about the central axis, with keys designed to be accessible radially from an inside and to be removed first on a dismantling of the sub-assembly in question, and arch segments supported and locked in position by the keys, and designed to become maneuverable after they have been released by the removal of the keys.

4. The tool according to claim 3, wherein flanks of at least one key, which define the angular sector occupied by said key azimuthally about the central axis and thus form parting lines along which said key interacts with the arch segments adjacent to said key within the annular sub-assembly, are parallel to an imaginary sagittal meridian plane, which corresponds to the radial plane that contains the central axis and intersects a middle of the angular sector occupied by the key in question, so that said flanks allow an extraction of the key from the arch segments adjacent to it by sliding and/or tilting along said parting lines.

5. The tool according to claim 3, wherein the grooves in a single sector are each delimited by two lateral walls that are generated in an axial generative direction parallel to the central axis, or that form taper faces that flare from a bottom of the groove to the receiving surface so as to open up, in a whole of an inside of the groove in question, a free space that contains an imaginary necessary clearance volume generated by virtually moving the stay in question along a virtual exit trajectory contained in an axial generative direction parallel to the central axis, so that said grooves allow an axial extraction of the sector in question, in an axial extraction movement parallel to the central axis and directed towards the equatorial plane of the core, without the lateral walls of said grooves interfering with the stays during said axial extraction movement.

6. The tool according to claim 2, wherein the grooves are generated along radial planes containing the central axis, so as to make it possible to place stays extending along said radial planes within the tire.

7. The tool according to claim 2, wherein the grooves are criss-crossed so as to describe a grid on the receiving surface, in order to make it possible to place crossed stays within the tire.

8. The tool according to claim 7, wherein the criss-crossed grooves in a single sector are each delimited by two lateral walls that are generated in an oblique generative direction, which is contained in a sagittal meridian plane that intersects a middle of the sector in question, and which, in said sagittal meridian plane, converges towards the central axis in the direction going from the lug in question towards an opposite lug, and forms with the central axis a colatitude angle, which is non-zero and strictly less than 90 degrees.

9. The tool according to claim 8, wherein flanks, and therefore parting lines, which define a key in question, are generated in the oblique generative direction on a basis of a base profile that corresponds i) either, according to a first option, to a intersection of the receiving surface and a radial plane that is angularly offset azimuthally relative to the sagittal meridian plane of said key by a value such that the base profile passes through opposite vertices of units of the grid which are defined on the receiving surface by the criss-crossed grooves that follow on from each other from the crown zone to the lateral zone along said base profile, ii) or, according to a second option, to a zigzag broken line formed, on the receiving surface, by alternating sides of the units of the grid which are defined on the receiving surface by the criss-crossed grooves and follow on from each other from the crown zone to the lateral zone.

10. The tool according to claim 1, wherein the passages for the stays are delimited by lateral walls, and wherein the core has, on a back of said lateral walls, below the receiving surface, and penetrating between the passages, recesses that are distinct from the passages and separated from said passages by the lateral walls.

11. The tool according to claim 1, wherein the barrier device comprises masking elements to form a screen on the receiving surface between the components of the wall of the tire and openings of the passages.

12. The tool according to claim 11 wherein the masking elements comprise a flexible tape retained by an adhesive.

13. The tool according to claim 12 wherein the flexible tape is a metal tape.

14. The tool according to claim 11 wherein masking elements comprise shells.

15. The tool according to claim 14 wherein masking elements also comprise masking strips.

16. A method for manufacturing a toroidal tire comprising a crown suitable for forming a tread, a first annular bead and a second annular bead designed to make it possible to attach the tire to a mounting support such as a rim, together with a first sidewall and a second sidewall that connect the crown to the first bead and to the second bead respectively, the crown, the first and second sidewalls and the first and second beads as a whole forming a wall having a concave inner surface that defines a cavity of the tire, said tire comprising reinforcing elements connecting a crown anchor point situated in the crown of the tire to a lateral anchor point situated in one of the sidewalls or beads of the tire, said method comprising a preparation step during which a tool constructed according to claim 1 is prepared, a step of placing stays, during which a reinforcing thread, suitable for forming a stay, is passed through each passage of the core, using a continuous reinforcing thread that is arranged in a snake through the successive passages by taking said continuous reinforcing thread back and forth in one piece from one lateral zone of the core to the other lateral zone, passing through the crown zone, then a packing step during which the components forming the crown, the sidewalls and the beads of the tire are deposited on the receiving surface by winding said components onto the rotating core, in order to build the wall of the tire, then a curing step, then a demolding step during which the core is disengaged from the tire, leaving the stays in place in the cavity of said tire.

17. The method according to claim 16, wherein, following the preparation step, and before the step of placing the stays, said method comprises a pre-packing step during which anchor structures that are designed to receive the ends of the stays that emerge from the passages of the core and to adhere to the components forming the sidewalls, the beads or the crown respectively, by sandwiching said ends of the stays between the anchor structures and said components, in order to fasten the stays to the anchor points provided, are laid on the lateral zones and on the crown zone of the receiving surface of the core, facing the anchor points provided for attaching the stays to the wall of the tire.

18. The method according to claim 16, wherein, as the core comprises a central ring, and a left lug and a right lug containing the passages for stays in the form of grooves that are open on the receiving surface, each of said central ring and lugs being angularly split into sectors forming keys alternating with arch segments, the demolding step firstly comprises a sub-step of removing the central ring, during which the keys of the central ring, then the arch segments of the central ring, are radially removed, in order to release the lugs, then a second sub-step of extracting a first lug during which the keys of one of the left and right lugs are extracted from the cavity of the tire, then the arch segments of said lug are extracted from the cavity of the tire, in order to release the corresponding portion of the cavity and the stays that are located in said corresponding portion of the cavity, and a third sub-step of extracting the other lug during which the keys of the other lug are extracted from the cavity of the tire, then the arch segments of said other lug are extracted from the cavity of the tire, in order to release the corresponding portion of the cavity and the stays that are located in said corresponding portion of the cavity, and in that the sectors of each lug are extracted in an extraction movement that depends on an arrangement of the lateral walls of the grooves, namely i) in an axial translational extraction movement, followed by a tilting movement about an axis normal to a sagittal meridian plane of the sector in question, if the lateral walls of the grooves are generated in an axial generative direction parallel to the central axis, or ii) in an oblique centripetal translational movement, simultaneously comprising an axial component and a radial component, if the lateral walls of the grooves are generated in an oblique generative direction that intersects the central axis at a non-zero acute colatitude angle.

19. The method according to claim 16, wherein, after the step of placing stays, said method comprises a protection step, during which the barrier device is implemented which, during the packing step and during the curing step, interacts with the core to obstruct the penetration of the components forming the crown, the sidewalls or the beads of the tire into the passages of the core in which the stays are engaged by applying to the receiving surface, before the packing step, masking elements that cover the passages and thus form a screen between said passages and the components of the wall of the tire, or by using a filling element that temporarily fills, at least during the curing step, the volume of each passage that is left free between the stay engaged in said passage and the opening(s) of said passage that emerge(s) on the receiving surface.

20. A tool for manufacturing a toroidal tire that has a crown suitable for forming a tread, a first annular bead and a second annular bead designed to make it possible to attach the tire to a mounting support such as a rim, together with a first sidewall and a second sidewall that connect the crown to the first bead and to the second bead respectively, the crown, the first and second sidewalls, and the first and second beads as a whole forming a wall having a concave inner surface that defines a cavity of the tire, said tool comprising:

a toroidal core having, about its central axis, a convex outer receiving surface, which has a shape conjugate to the inner surface of the wall of the tire and which comprises to this end a radially outer crown zone suitable for receiving components forming the crown of the tire and, axially on either side of said crown zone, a first lateral zone turned in towards the central axis and suitable for receiving components forming the first sidewall and the first bead, together with a second lateral zone turned in towards the central axis and suitable for receiving components forming the second sidewall and the second bead, so that the core embodies a reserved volume which is externally delimited by the receiving surface and corresponds to the cavity of the tire;

the core having a plurality of passages that extend inside the reserved volume, below the receiving surface, and which open onto said receiving surface so that each of said passages connects the crown zone of the receiving surface to one of the first and second lateral zones so that the core can receive, inside said passages, stays which are designed to be permanently incorporated into the structure of the tire and each extend in the cavity of the tire, connecting a crown anchor point situated in the crown of the tire to a lateral anchor point situated in one of the sidewalls or beads of the tire;

wherein the passages for stays are formed by grooves that are hollowed out from the receiving surface in a thickness of the reserved volume so that they have a continuous opening along the profile of the receiving surface, from the crown zone to the lateral zone in question, wherein the core comprises an assembly of a plurality of annular sub-assemblies comprising;

i) a central ring, which forms a central portion of the crown zone of the receiving surface suitable for receiving one or more components forming the crown of the tire, said central ring being without passages for stays;

ii) a left lug, which is axially adjacent to the central ring, said left lug comprising the first lateral zone of the receiving surface as well as a portion of the crown zone that axially extends the central portion of the crown zone on the corresponding side of the central ring, and said left lug containing the grooves forming the passages for the stays that connect the first sidewall of the tire to the crown of the tire; and iii) a right lug, which is axially adjacent to the central ring, on the side of the central ring that is axially opposite the side receiving the left lug, said right lug comprising the second lateral zone of the receiving surface as well as a portion of the crown zone that axially extends the central portion of the crown zone on the corresponding side of the central ring, and said right lug containing the grooves forming the passages for the stays that connect the second sidewall of the tire to the crown of the tire;

wherein the central ring, the left lug, and the right lug are each angularly split into sectors azimuthally about the central axis, with keys designed to be accessible radially from an inside and to be removed first on a dismantling of the sub-assembly in question, and arch segments supported and locked in position by the keys, and designed to become maneuverable after they have been released by the removal of the keys.

21. The tool according to claim 20, wherein flanks of at least one key, which define the angular sector occupied by said key azimuthally about the central axis and thus form parting lines along which said key interacts with the larch segments adjacent to said key within the annular sub-assembly, are parallel to an imaginary sagittal meridian plane, which corresponds to the radial plane that contains the central axis and intersects a middle of the angular sector occupied by the key in question, so that said flanks allow an extraction of the key from the arch segments adjacent to it by sliding and/or tilting along said parting lines.

22. The tool according to claim 20, wherein the grooves in a single sector are each delimited by two lateral walls that are generated in an axial generative direction parallel to the central axis, or that form taper faces that flare from a bottom of the groove to the receiving surface so as to open up, in a whole of an inside of the groove in question, a free space that contains an imaginary necessary clearance volume generated by virtually moving the stay in question along a virtual exit trajectory contained in an axial generative direction parallel to the central axis, so that said grooves allow an axial extraction of the sector in question, in an axial extraction movement parallel to the central axis and directed towards the equatorial plane of the core, without the lateral walls of said grooves interfering with the stays during said axial extraction movement.

23. The tool according to claim 20, wherein the grooves are generated along radial planes containing the central axis, so as to make it possible to place stays extending along said radial planes within the tire.

24. The tool according to claim 20, wherein the passages for the stays are delimited by lateral walls, and wherein the core has, on a back of said lateral walls, below the receiving surface, and penetrating between the passages, recesses that are distinct from the passages and separated from said passages by the lateral walls.

* * * * *